United States Patent
Kumagai et al.

(10) Patent No.: US 9,984,064 B2
(45) Date of Patent: May 29, 2018

(54) REDUCTION OF MEMORY USAGE IN FEATURE GENERATION

(71) Applicant: International Business Machines Corporation, Armonk, NY (US)

(72) Inventors: Ken Kumagai, Tokyo (JP); Akihiro Nakayama, Kawasaki (JP)

(73) Assignee: International Business Machines Corporation, Armonk, NY (US)

(*) Notice: Subject to any disclaimer, the term of this patent is extended or adjusted under 35 U.S.C. 154(b) by 0 days. days.

(21) Appl. No.: 14/938,040

(22) Filed: Nov. 11, 2015

(65) Prior Publication Data
US 2017/0132206 A1    May 11, 2017

(51) Int. Cl.
G06F 17/20    (2006.01)
G06F 17/27    (2006.01)
G06F 17/30    (2006.01)
G06F 17/22    (2006.01)

(52) U.S. Cl.
CPC .......... *G06F 17/278* (2013.01); *G06F 17/227* (2013.01); *G06F 17/2217* (2013.01); *G06F 17/277* (2013.01); *G06F 17/30625* (2013.01)

(58) Field of Classification Search
CPC .......... G06F 17/20; G06F 17/21; G06F 17/18; G06F 17/22; G06F 17/229; G06F 17/2241; G06F 17/2247; G06F 17/27; G06F 17/2705; G06F 17/271; G06F 17/275; G06F 17/277; G06F 17/278
USPC ................................................ 704/9, 1, 7, 10
See application file for complete search history.

(56) References Cited

U.S. PATENT DOCUMENTS

| 7,822,598 B2 | 10/2010 | Carus et al. |
| 8,370,128 B2 | 2/2013 | Brun et al. |
| 8,380,758 B1 * | 2/2013 | Stephens ............. G06F 9/45512 370/392 |

(Continued)

FOREIGN PATENT DOCUMENTS

| WO | 2009017464 A1 | 2/2009 |
| WO | 2015074071 A1 | 5/2015 |

OTHER PUBLICATIONS

Aoe, J., "An Efficient Digital Search Algorithm by Using a Double-Array Structure," IEEE Transactions on Software Engineering, vol. 15, No. 9, Sep. 1989, pp. 1066-1077, Copyright 1989 IEEE.

(Continued)

*Primary Examiner* — Qi Han
(74) *Attorney, Agent, or Firm* — Nolan M. Lawrence

(57) ABSTRACT

An alignment of attributes is extracted from a pair of mentions in an annotated corpus. An annotated document is read from the annotated corpus. Three character string arrays (A, B, and C) are stored into a first TRIE. The character string arrays include character string representations of attributes of one or more first tokens, second tokens, and neighborhood tokens of mentions of the annotated document, respectively. The storing into the first TRIE obtains partial integer arrays (K, L, and M) that include identifiers corresponding to the attributes of the mentions. The partial integer arrays are stored into a second TRIE. The storing into the second TRIE obtains an identifier array (X) that includes three identifiers. The identifier array is stored into a third TRIE. The storing into the TRIE obtains one identifier of the alignment of attributes.

19 Claims, 19 Drawing Sheets

(56) References Cited

U.S. PATENT DOCUMENTS

| | | | | |
|---|---|---|---|---|
| 8,473,501 | B2* | 6/2013 | Weber | G06F 17/30625 707/752 |
| 8,630,989 | B2 | 1/2014 | Blohm et al. | |
| 8,874,432 | B2 | 10/2014 | Qi et al. | |
| 9,043,197 | B1* | 5/2015 | Pasca | G06F 17/30654 704/10 |
| 2010/0145902 | A1 | 6/2010 | Boyan et al. | |
| 2015/0066483 | A1 | 3/2015 | Zhang | |

OTHER PUBLICATIONS

Greaves, M., "Relation Extraction using Distant Supervision, SVMs, and Probabilistic First Order Logic," A thesis submitted in partial fullment of the requirements for the degree of Master of Science in Computer Science, CMU-CS-14-128, May 2014, 62 pages, Copyright 2014 Malcolm W. Greaves.

Kambhatla, N., "Combining Lexical, Syntactic, and Semantic Features with Maximum Entropy Models for Extracting Relations," Proceedings of the ACL 2004 on Interactive poster and demonstration sessions, Article No. 22, 4 pages DOI: 10.3115/1219044.1219066.

Luo et al., "A Mention-Synchronous Coreference Resolution Algorithm Based on the Bell Tree," Proceedings of the 42nd Annual Meeting on Association for Computational Linguistics, Article No. 135, 8 pages DOI: 10.3115/1218955.1218973.

Unknown, "Statistical Information and Relation Extraction (SIRE)," IBM Research, 1 page, last updated Mar. 10, 2015, last printed Aug. 18, 2015, http://researcher.watson.ibm.com/researcher/view_group.php?id=2223.

Unknown, "Alphabetical list of part-of-speech tags used in the Penn Treebank Project," Penn Treebank P.O.S. Tags, 1 page, last printed Oct. 14, 2015, https://www.ling.upenn.edu/courses/Fall_2003/ling001/penn_freebank_pos.html.

Riedel et al., "Modeling Relations and Their Mentions without Labeled Text," Proceedings of the 2010 European conference on Machine learning and knowledge discovery in databases: Part III, 16 pages, Sep. 20-24, 2010, Springer-Verlag Berlin, Heidelberg ©2010.

\* cited by examiner

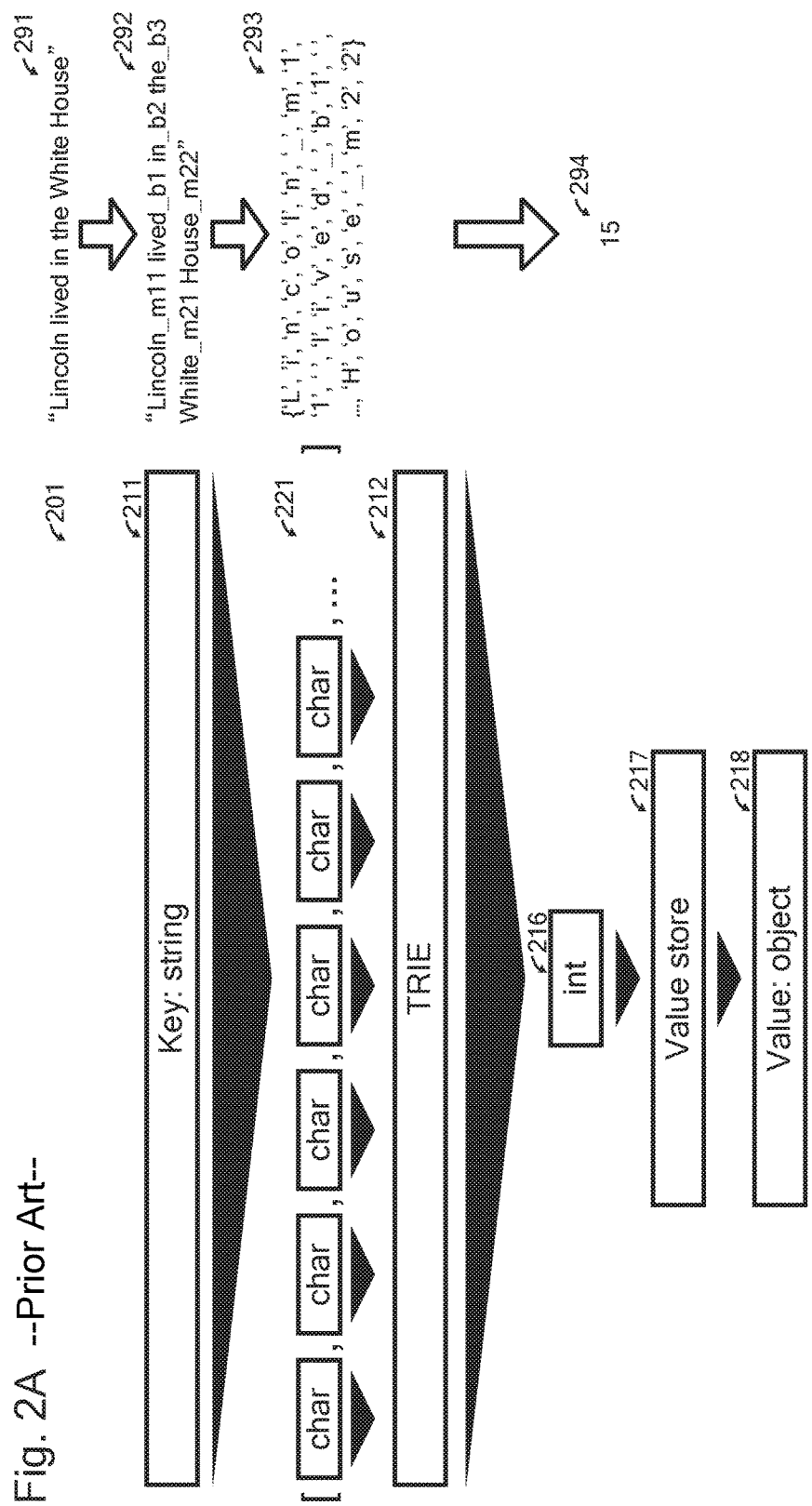
Fig. 2A --Prior Art--

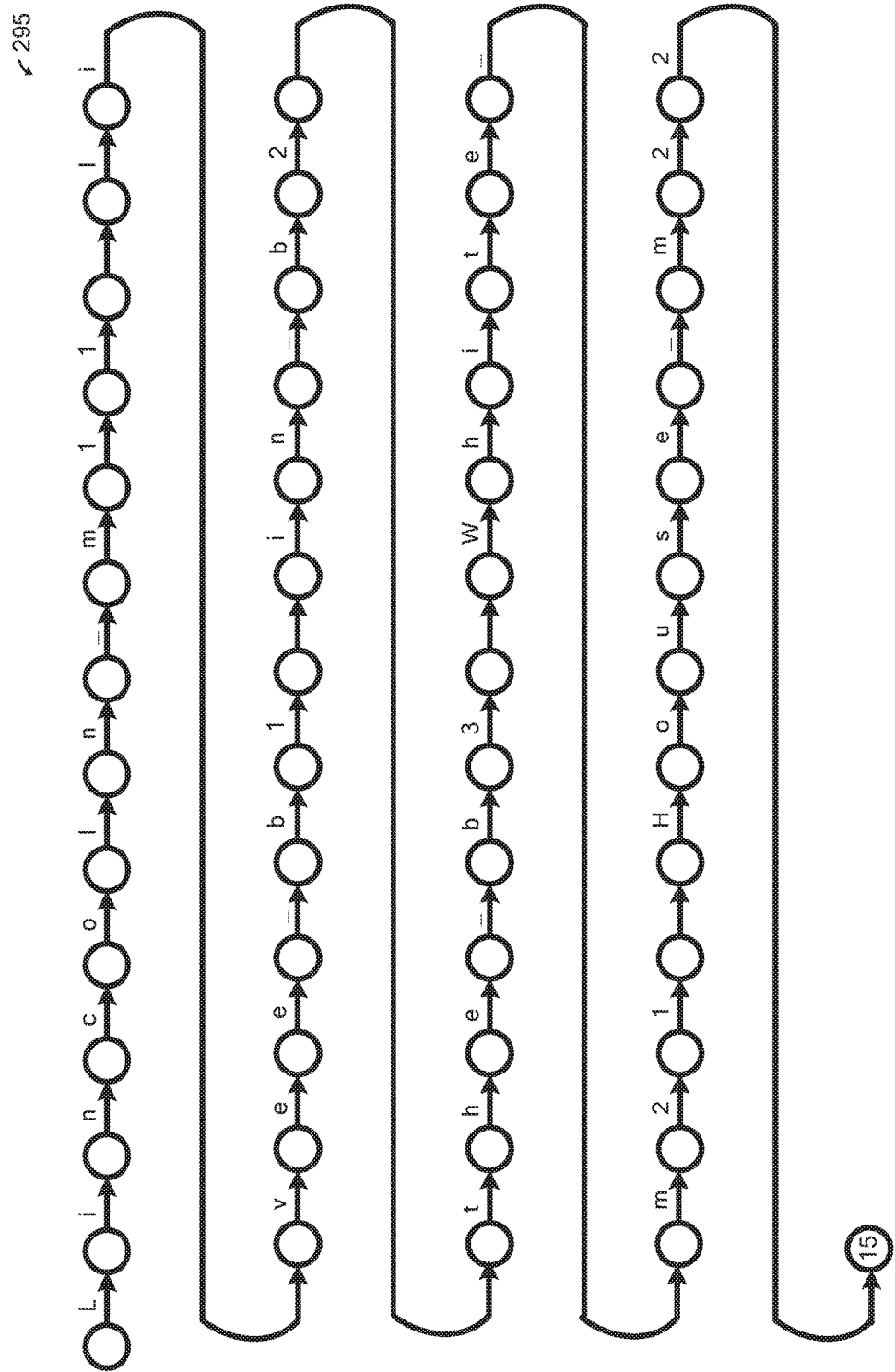
Fig. 2B --Prior Art--

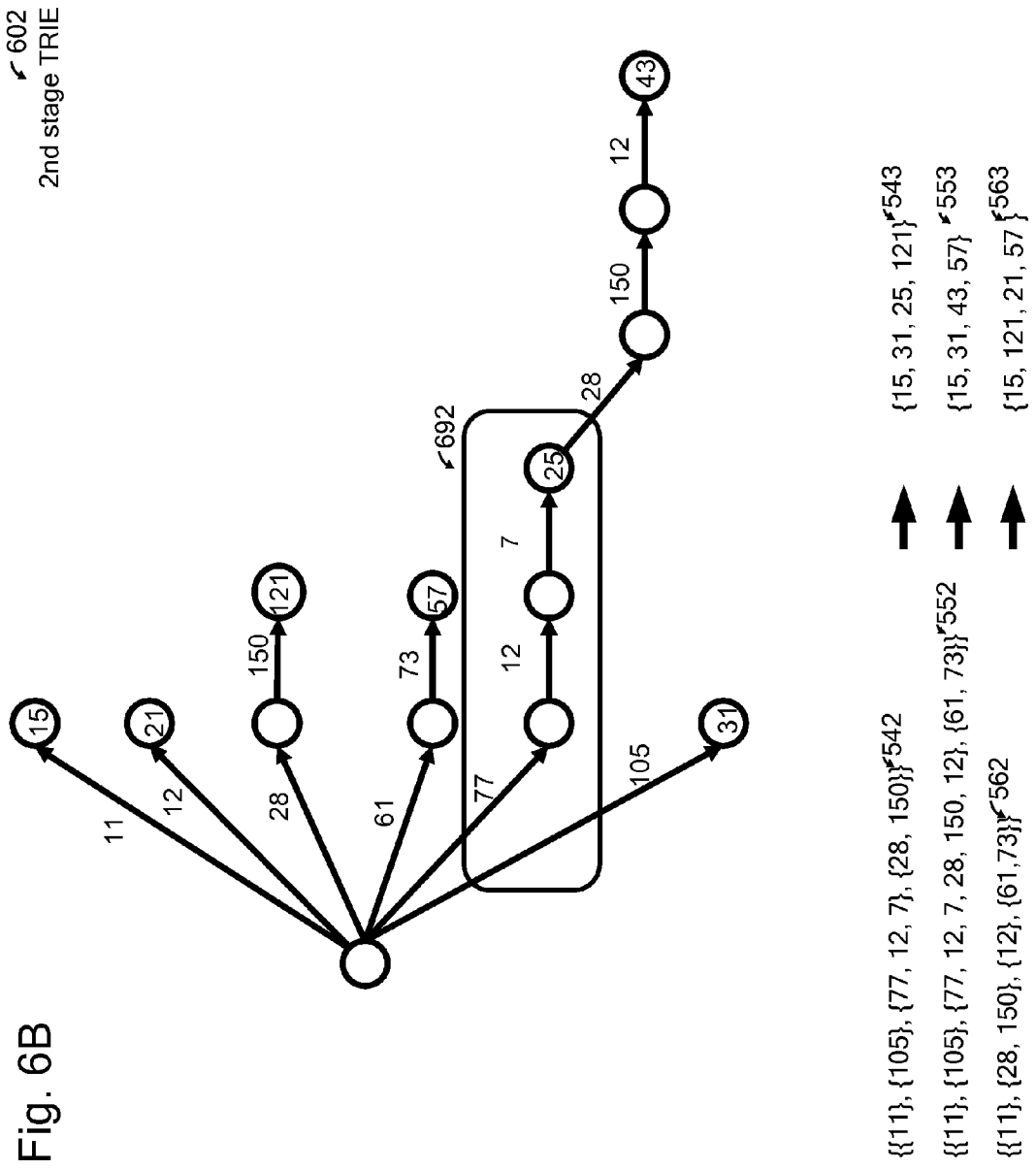

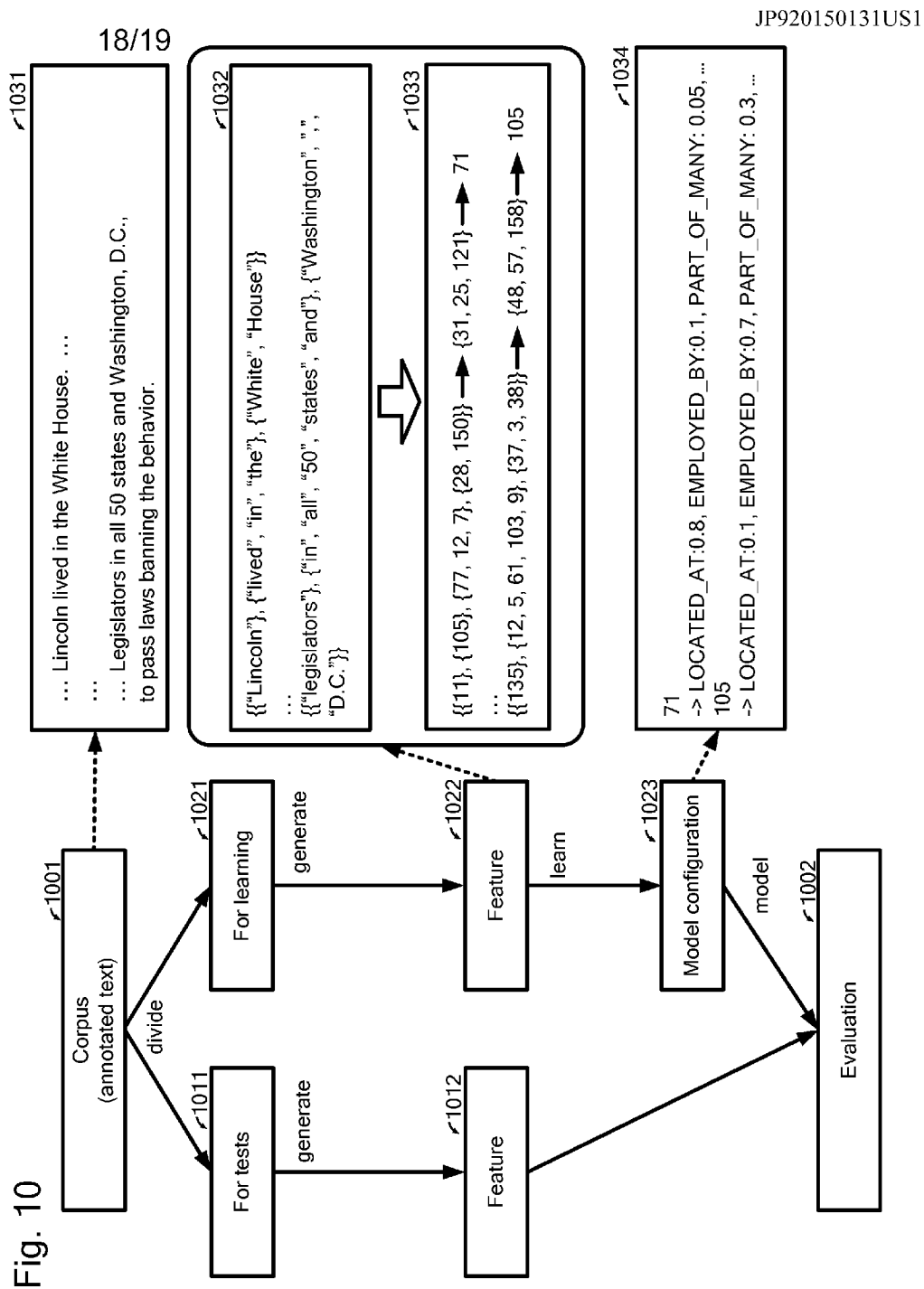

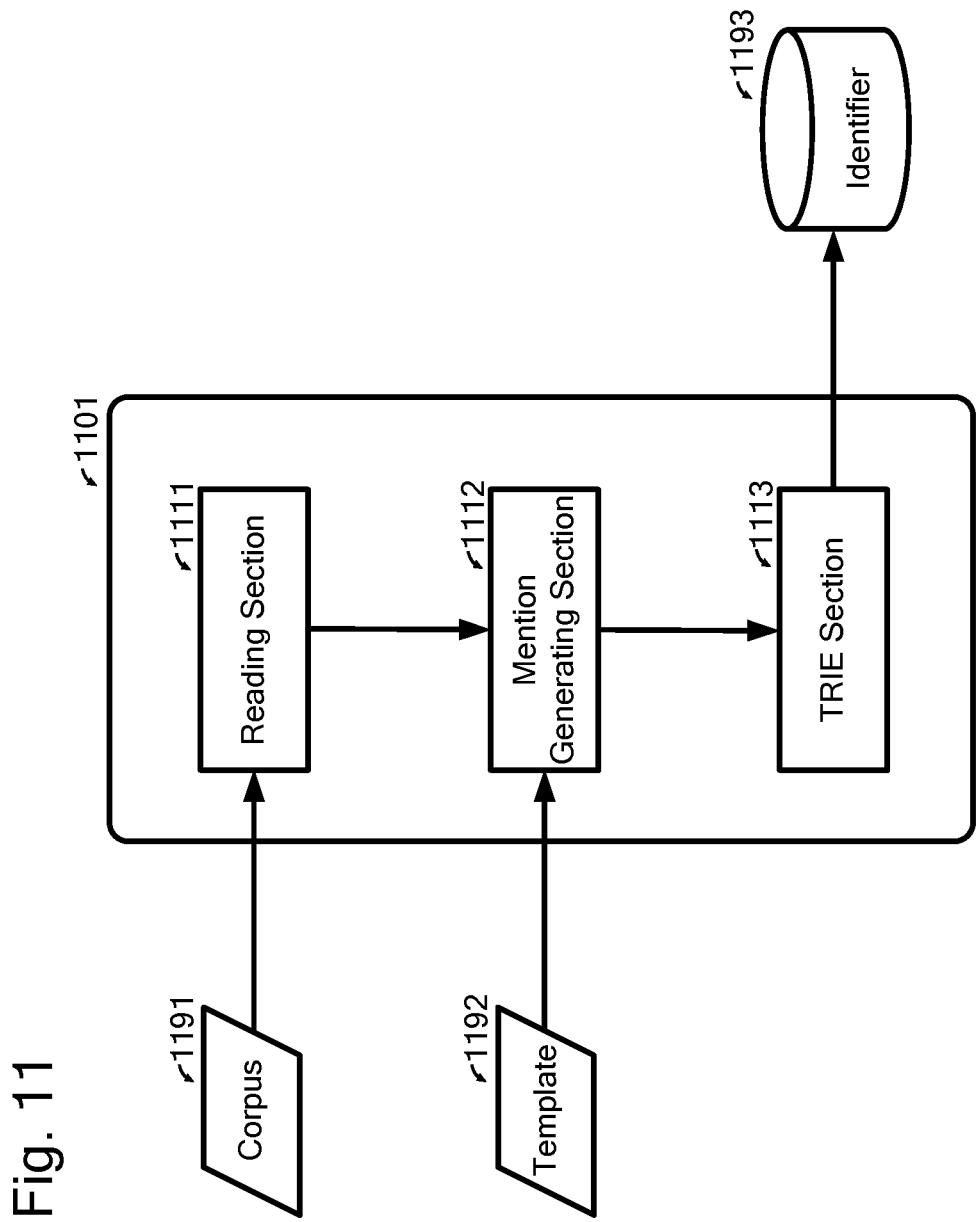

REDUCTION OF MEMORY USAGE IN FEATURE GENERATION

BACKGROUND

The present disclosure relates to a feature generation at the time of information extraction, and more specifically, to a reduction of memory usage in a feature generation at the time of information extraction.

When information such as a named entity or a relation may be extracted from a text by machine learning, a corpus is read and, then, a model is generated. In the relation extraction, whether or not the predefined relation exists is determined, using as an input two or more named entity mentions (hereinafter also referred to as "NEs"). Features used in the relation extraction are often generated from NEs and data between the NEs. For features generation, a feature template such as "AllWords" may be used. The feature template, "AllWords", is a scheme for coupling a token belonging to two NEs and a token between the NEs, where a space serves as a delimiter.

In some conventional machine learning scenarios, suffixes are given to the tokens so as to discriminate whether each token belong to the NE or is a token between the NEs.

SUMMARY

Aspects of the present disclosure provide for a method, system, and computer program product for assigning an identifier to an alignment of attributes extracted from a pair of mentions in an annotated corpus. An annotated document is read from the annotated corpus. A character string array A, a character string array B, and a character string array C are stored into a first TRIE. Character string array A includes one or more first character strings each representing a first mention attribute of each of one or more first tokens included in a first mention in the annotated document. Character string array B includes one or more second character strings each representing a second mention attribute of each of one or more second tokens included in a second mention in the annotated document. Character string array C includes one or more neighbor character strings each representing a neighbor attribute of each of one or more neighborhood tokens neighboring the first mention or the second mention. The storing into the first TRIE obtains a partial integer array K that includes one or more first identifiers, each first identifier corresponding to the first mention attribute. The storing into the first TRIE also obtains a partial integer array L that includes one or more second identifiers, each second identifier corresponding to the second mention attribute. The storing into the first TRIE also obtains a partial integer array M that includes one or more neighbor identifiers, each neighbor identifier corresponding to the neighbor attribute. The partial integer arrays K, L, and M are stored into a second TRIE. The storing into the second TRIE obtains an identifier array X that includes a first mention identifier, second mention identifier, and a token identifier. The identifier array X is stored into a third TRIE. The storing into the third TRIE obtains one identifier of the alignment of attributes.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 2A illustrates a conventional manner of storing a suffix-added character string into TRIE as inputs.

FIG. 2B illustrates a conventional manner in which a character string is stored into a TRIE.

FIG. 6B illustrates an embodiment of a tree generated in a process of the 2nd stage TRIE.

FIG. 10 illustrates an embodiment of a flowchart for extracting information using an embodiment of the present disclosure.

FIG. 11 illustrates an embodiment of an overall functional block diagram of a computer system hardware used in accordance with the embodiment of the flowcharts described in FIGS. 8A to 8D.

Figure 1:
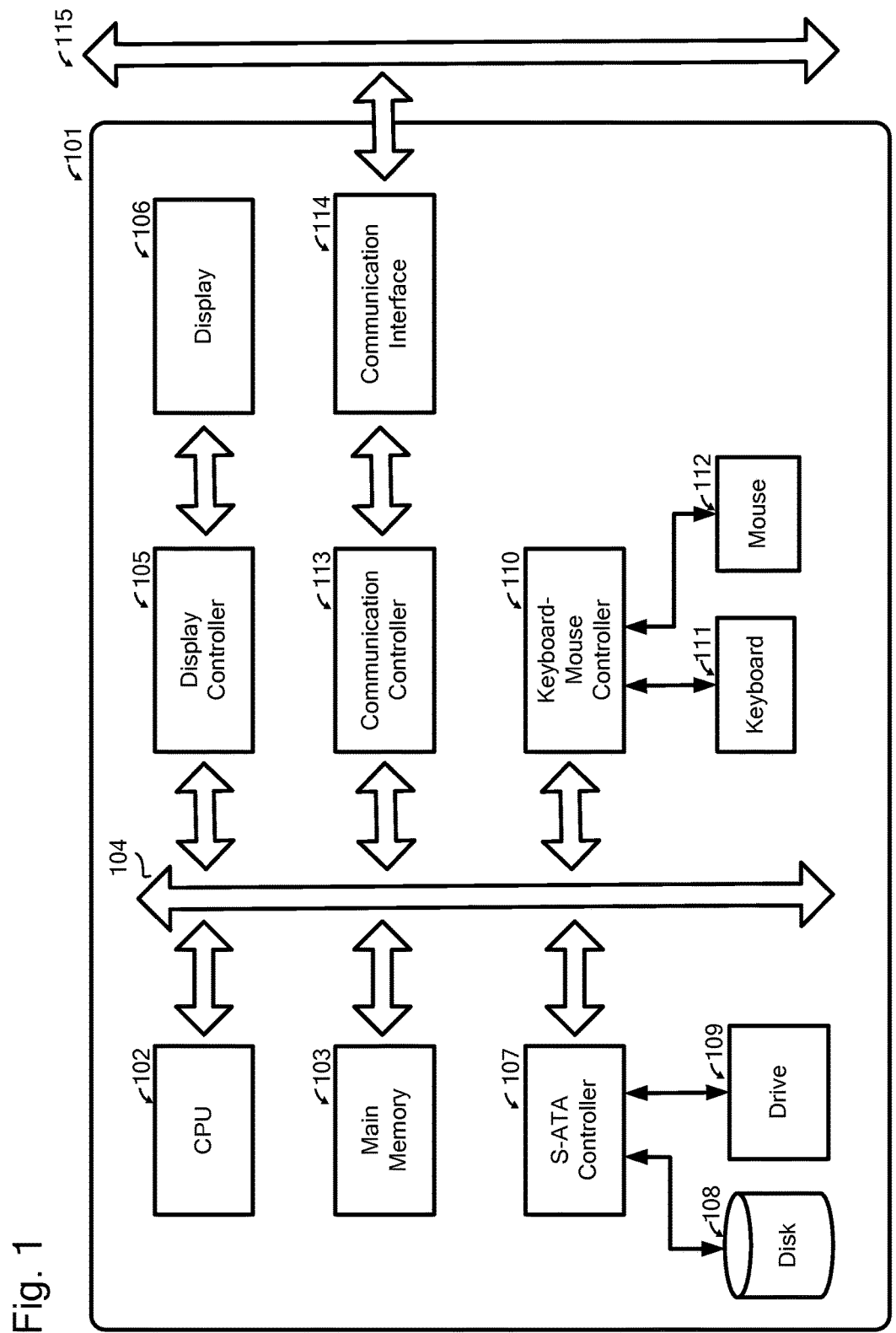
FIG. 1 illustrates an exemplified basic block diagram of a computer hardware used in an embodiment of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to a feature generation at the time of information extraction, more particular aspects relate to a reduction of memory usage in a feature generation at the time of information extraction. While the present disclosure is not necessarily limited to such applications, various aspects of the disclosure may be appreciated through a discussion of various examples using this context.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

To define more clearly the terms used herein, the following exemplified definitions are provided, but the meaning of the terms should be interpreted broadly as known in the technical field to which the present disclosure relates.

The term "a named entity" may refer to an entity mention in the form of a named entity text string. The named entity is typically in the form of a proper noun. Examples of NEs are for example, but not limited to, a Person Mention, such as: "Abraham Lincoln", "Lincoln" and "he"; a Location Mention, such as: "White House, "New York City", "State of New York" and "The United States of America"; a Product Named Entity Mention, such as: "z System", and "WATSON"; an Organism Mention; a Gene Mention; a Protein Mention; and a Song Mention. The named entity may also refer to as "NE" or simply "mention", which are interchangeably used in the present specification. If the sentence is "Lincoln lived in the White House", the terms, "Lincoln" and "White House" may belong to the NE.

The term "a relation" may refer to a relation between NEs. If a sentence is "Lincoln lived in the White House", a relation between "Lincoln" and "White House" may be "LOCATED_AT".

With reference now to FIG. 1, FIG. 1 illustrates an exemplified basic block diagram of a computer hardware used in an embodiment of the present disclosure.

A computer (101) may be, for example, but is not limited to, a desktop, a laptop, a notebook, a tablet or a server computer. The server computer may be, for example, but is not limited to, a workstation, a rack-mount type server, a blade type server, or a mainframe server and may run, for example, a hypervisor for creating and running one or more virtual machines. The computer (101) may comprise one or more CPUs (102) and a main memory (103) connected to a bus (104). The CPU (102) may be based on a 32-bit or 64-bit architecture.

A display (106) such as a liquid crystal display (LCD) may be connected to the bus (104) via a display controller (105). The display (106) may be used to display, for management of the computer(s), information on a computer connected to a network via a communication line and information on software running on the computer using an appropriate graphics interface. A disk (108) such as a hard disk or a solid state drive, SSD, and a drive (109) such as a CD, a DVD, or a BD (Blu-ray disk) drive may be connected to the bus (104) via an SATA or other controller (107). Moreover, a keyboard (111) and a mouse (112) may be connected to the bus (104) via a keyboard-mouse controller (110) or other bus (not shown).

An operating system, one or more programs, a processing environment, applications, virtual machines (VM), and (JIT) compilers, other programs, and any data may be stored in the disk (108) to be loadable to the main memory. The drive (109) may be used to install a program, such as the computer program of an embodiment of the present disclosure, readable from a CD-ROM, a DVD-ROM, or a BD to the disk (108) or to load any data readable from a CD-ROM, a DVD-ROM, or a BD into the main memory (103) or the disk (108), if necessary.

A communication interface (114) may be based on, for example, but is not limited to, one or more network protocols. The communication interface (114) may be connected to the bus (104) via a communication controller (113), and may physically connect the computer (101) to a communication line (115), and may provide a network interface layer to one or more communication protocols of a communication function of the operating system of the computer (101). In some embodiments, the communication line (115) may be a wired local area network (LAN) environment or a wireless LAN environment based on wireless LAN connectivity standards.

FIGS. 2A and 2B illustrate a conventional manner of using a TRIE and a tree made in a process of the TRIE.

Hereinafter in an explanation of FIGS. 2A and 2B, a sentence selected from a document in a corpus, "Lincoln lived in the White House" (291), is used. In the sentence (291), the NEs are "Lincoln" and "White House". A feature function template, "AllWords", is used for extracting a relation between the NEs in the sentence (291), using the NEs and inter-entity data.

With reference to FIG. 2A, FIG. 2A illustrates a conventional manner of storing a suffix-added character string into the TRIE as inputs.

An overall flowchart (201) shows a conventional manner of storing suffix-added character strings into the TRIE as inputs. For an implementation of the TRIE in the conventional approach, the TRIE is implemented as, for example, a double-array TRIE. The following describes an example double-array TRIE: Jun-ichi Aoe, "An Efficient Digital Search Algorithm by Using a Double-Array Structure", 1989. In some embodiments, a TRIE may be an ordered tree data structure that is used to store a dynamic set or associative array where the keys may be strings.

In step 211, the computer selects the sentence of the document. The computer may generate a key or character string arrays from the sentence, "Lincoln lived in the White House" (291), using the feature function template, "AllWords". The generated key is the suffix-added character string, "Lincoln_m11 lived_b1 in_b2 the_b3 White_m21 House_m22" (292). The suffixes are given to the tokens so as to discriminate whether each token belongs to the NE or belongs to the inter-entity that resides between the NEs. In the case of AllWords, suffixes are used when generating features associated with the tokens of the NEs or inter-entity tokens. See Generally, Nanda Kambhatla, "Combining Lexical, Syntactic, and Semantic Features with Maximum Entropy Models for Extracting Relations", 2004, which may further describe an addition of the suffix.

The suffix "m11" after the term, "Lincoln", refers that the term, "Lincoln", is the first NE in the sentence and the first term in the first NE. The suffix "m21" after the term, "White", refers that the term, "White", is the second NE in the sentence and the first term in the second NE. The suffix "m22" after the term, "House", refers that the term, "House", is the second NE in the sentence and the second term in the second NE.

The computer prepares character string array (221) from the suffix-added character string. When the sentence is "Lincoln lived in the White House" (291), the character string array (221) comprises a plurality of characters. The character string array (221) may be described as {'L', 'i', 'n', 'c', 'o', 'l', 'n', '_', 'm', '1', '1', ' ', 'l', 'i', 'v', 'e', 'd', '_', 'b', '1', ' ', 'i', 'n', '_', 'b', '2', ' ', 't', 'h', 'e', '_', 'b', '3', ' ', 'W', 'h', 'i', 't', 'e', '_', 'm', '2', '1', ' ', 'H', 'o', 'u', 's', 'e', '_', 'm', '2', '2'} (293).

In step 212, the computer stores the character string array (221) into a TRIE to obtain an int value. When character string array (221) is {'L', 'i', 'n', 'c', 'o', 'l', 'n', '_', 'm', '1', '1', ' ', 'l', 'i', 'v', 'e', 'd', '_', 'b', '1', ' ', . . . , 'H', 'o', 'u', 's', 'e', '_', 'm', '2', '2'} (293), the int value is "15" (294). A variety of TRIE algorithms known in the art may be used. In the TRIE algorithm, a tree which is for storing each character in the character string array (221) may be generated.

With reference to FIG. 2B, FIG. 2B illustrates a conventional manner in which a character string is stored into the TRIE. The tree (295) illustrates an embodiment of storing the character string array (293).

With reference back to FIG. 2A, in step 216, the computer returns int value as an output of the input. When the sentence is "Lincoln lived in the White House" (291), the int value, "15" (294), is obtained as output. The int value is obtained such that the int value, "15" (294), is unique to the sentence (291) in the feature. The feature may be defined in a feature template file. In FIG. 2B, the tree (295) illustrates an embodiment of storing the character string array (293) and the int value, "15" (294).

In step 217, the computer stores the int value, "15" (294), into a value store, such as a memory or a disk.

In step 218, the computer may use the int value, "15" (294), for example, as a key value for extracting information such as a NE (or mention), or relation between the first mention and the second mention, or as a key value for co-occurrence solution in a search target document.

The suffixes which are used for the above discrimination may be unnecessary data. Accordingly and in some embodiments, it may be desirable in processing where a large amount of features are handled to eliminate unnecessary data such that memory efficiency is improved.

Figure 3:
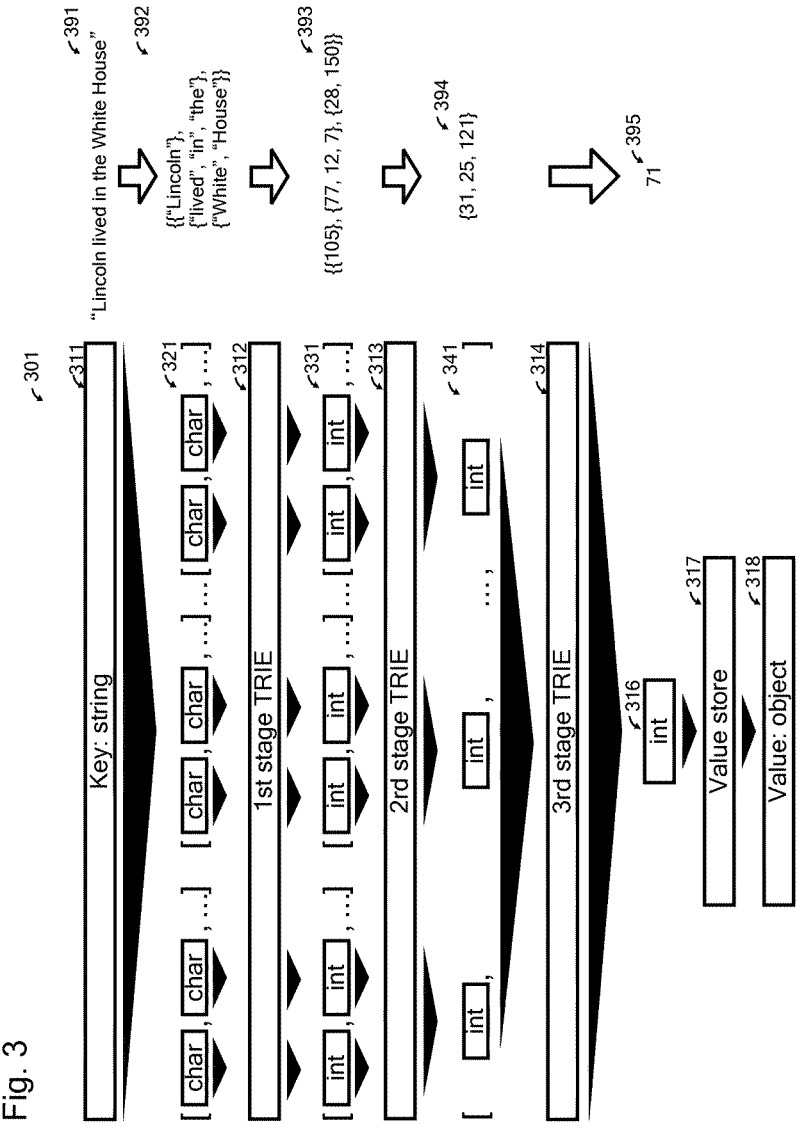
FIG. 3 illustrates one embodiment of triple stages TRIE data structure.
Figure 4:
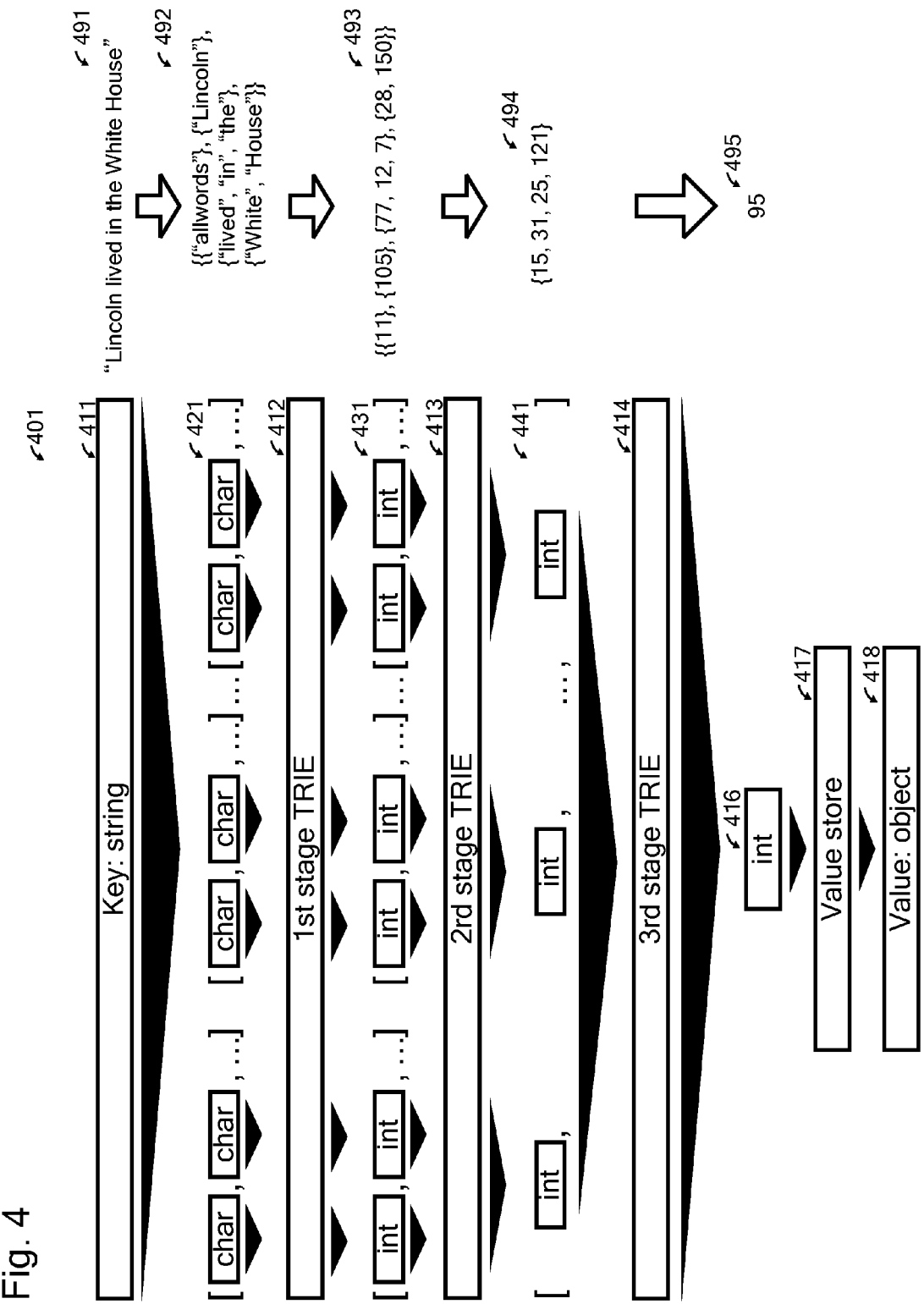
FIG. 4 illustrates another embodiment of triple stages TRIE data structure, using an identification name of a feature function template.

FIGS. 3 and 4 illustrate a triple stages TRIE data structure, according to one embodiment of the present disclosure.

Hereinafter in an explanation of FIGS. 3 and 4, a sentence selected from a document in a corpus, "Lincoln lived in the White House" (391, 491), is used. In the sentence, the NEs are "Lincoln" and "White House". A feature function template, "AllWords", is used for extracting a relation between the NEs in the sentence, by using the NEs and inter-entity data.

With reference to FIG. 3, FIG. 3 illustrates one embodiment of a triple stages TRIE data structure. The triple stage TRIE comprises a 1st stage TRIE (also referred to as a first TRIE), a 2nd stage TRIE (also referred to as a second TRIE) and a 3rd stage TRIE (also referred to as a third TRIE).

An overall flowchart (301) shows the embodiment of storing character string arrays as inputs into the 1st stage TRIE, storing partial integer arrays as inputs into the 2nd stage TRIE, and storing the identifier array as inputs into the 3rd stage TRIE. For each of the 1st, 2nd and 3rd stages TRIEs in the embodiment of the triple stages TRIE, each stage TRIE may be implemented as, for example, a double-array TRIE, as mentioned above.

In step 311, the computer (101) selects the sentence of the document. The computer (101) may generate a key or character string arrays from the sentence, "Lincoln lived in the White House" (391), by using the feature function template, "AllWords". The generated key comprises a character string array "a1" comprising one character string {"Lincoln"}, a character string array "b1" comprising three character strings {"lived", "in", "the"} and a character string array "c1" comprising two character strings {"White", "House"}. The character string {"Lincoln"} refers to an attribute of a token "Lincoln" in the sentence. The character strings {"lived", "in", "the"} refer to each attribute of each of tokens {"lived", "in", "the"} in the sentence. The character strings {"White", "House"} refer to each attribute of each of tokens {"White", "House"} in the sentence.

In step 312, the computer (101) stores the generated key or character string arrays (321) comprising the character string arrays a1, b1 and c1 into the 1st stage TRIE to obtain partial integer arrays (331) comprising a partial integer array "k1" derived from the character string array "a1", a partial integer array "l1" derived from the character string array "b1" and a partial integer array "m1" derived from the character string array "c1". For example, when the character string arrays (321) are the character string arrays {{"Lincoln"}, {"lived", "in", "the"}, {"White", "House"}} (392), the partial integer array "k1" is {105}; the partial integer array "l1" is {77,12,7}; and the partial integer array "m1" is {28,150}. Accordingly, the partial integer arrays (331) may be {{105}, {77,12,7}, {28,150}} (393). A variety of TRIE algorithms known in the art may be used for the 1st stage TRIE. In the 1st stage TRIE algorithm, a tree which is for storing each character in each of the character strings (321) may be generated.

In step 313, the computer (101) stores the partial integer arrays (331) into the 2nd stage TRIE to obtain an identifier array (341) comprising an identifier "31" derived from the partial integer array{105}, an identifier "25" derived from the partial integer array {77,12,7} and an identifier "121" derived from the partial integer array {28,150}. Accordingly, the identifier array (341) is {31,25,121} (394). A variety of TRIE algorithms known in the art may be used for the 2nd stage TRIE, which may be the same as or different from the 1st stage TRIE algorithm. In the 2nd stage TRIE algorithm, a tree which is for storing each integer in each of the partial integer array (331) may be generated.

In step 314, the computer (101) stores the identifier array (341) into the 3rd stage TRIE to obtain one identifier (316) of the alignment of attributes for the sentence (391). The alignment may include an order of appearing string characters.

When the identifier array (341) is {31,25,121} (394), one identifier may be "71" (395). Accordingly, one identifier, "71" (395), is obtained as an output. One identifier is obtained such that the identifier, "71" (395), is unique to the sentence in the feature. The feature may be defined in the feature template file. A variety of TRIE algorithms known in the art may be used for the 3rd stage TRIE, which may be the same as or different from the 1st stage TRIE algorithm and/or the 2nd stage TRIE algorithm. In the 3rd stage TRIE algorithm, a tree which is for storing each integer in the identifier array (341) may be generated.

In step 316, the computer (101) returns an int value as an output of the input. When the sentence is "Lincoln lived in the White House" (391), the int value, "71" (395), is obtained as output. The int value is obtained such that the int value, "71" (395), is unique to the sentence in the feature.

In step 317, the computer (101) stores the int value, "71" (395), into a value store, such as a memory (103) or a disk (109). The assignment of the int value to an alignment of attributes extracted from a pair of mentions in an annotated corpus may be performed by storing the int value into the value store.

In step 318, the computer (101) may use the int value, "71" (395), for example, as a key value for extracting information such as a NE (or mention) or relation between the first mention and the second mention or as a key value for co-occurrence solution in a search target document.

With reference to FIG. 4, FIG. 4 illustrates another embodiment of a triple stages TRIE data structure, using an identification name of a feature function template.

An overall flowchart (401) shows the embodiment of storing character string arrays including (393) and an identifier of a feature function template, as inputs, into a 1st stage TRIE, storing partial integer arrays as inputs into a 2nd stage TRIE, and storing the identifier array as inputs into a 3rd stage TRIE.

In step 411, the computer (101) selects the sentence of the document. The computer (101) generates a key or character string arrays from the sentence, "Lincoln lived in the White House" (491), using the feature function template, "AllWords". The generated key comprises a character string array "d2" comprising one character string {"allwords"}, a character string array "a2" comprising one character string {"Lincoln"}, a character string array "b2" comprising three character strings {"lived", "in", "the"} and a character string array "c2" comprising two character strings {"White", "House"}. The character string {"allwords"} refers to an identification name of the feature function template, "AllWords". The character string {"Lincoln"} refers to an attribute of a token "Lincoln" in the sentence. The character strings {"lived", "in", "the"} refer to each attribute of each of tokens {"lived", "in", "the"} in the sentence. The character strings {"White", "House"} refer to each attribute of each of tokens {"White", "House"} in the sentence.

Figure 6A:
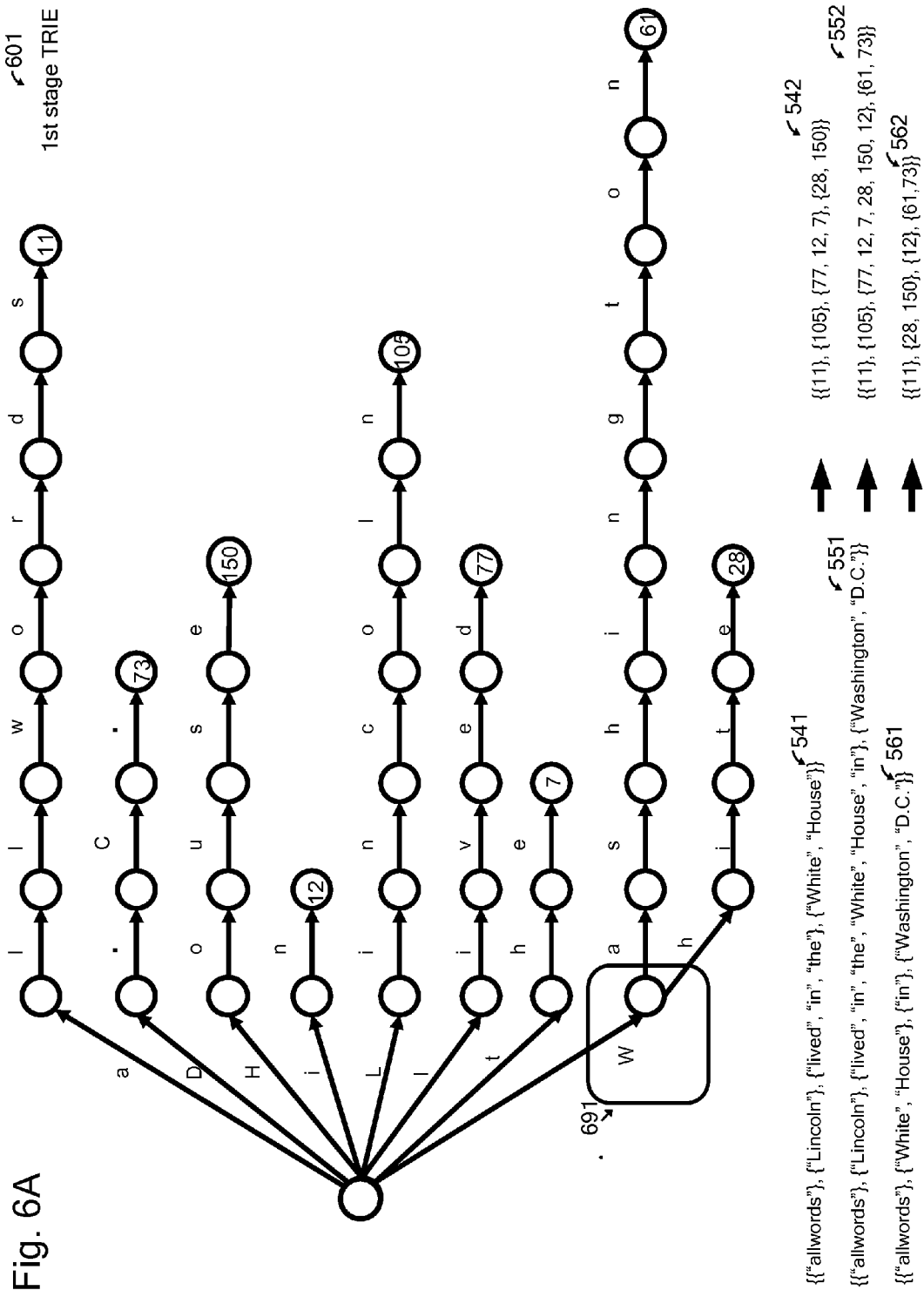
FIG. 6A illustrates an embodiment of a tree generated in a process of the 1st stage TRIE.

In step 412, the computer (101) stores the generated key or character string arrays (421) comprising the character string array d2, a2, b2 and c2 into the 1st stage TRIE to obtain partial integer arrays (431) comprising a partial integer array "n2" derived from the character string array "d2", a partial integer array "k2" derived from the character string array "a2", a partial integer array "12" derived from the character string array "b2" and a partial integer array "m2" derived from the character string array "c2". When the character string arrays (421) are the character string arrays {{"allwords"}, {"Lincoln"}, {"lived", "in", "the"}, {"White", "House"}}(492), the partial integer arrays (431) may be {{11}, {105}, {77,12,7}, {28,150}} (493). A variety of TRIE algorithms known in the art can be used for the 1st stage TRIE. In the 1st stage TRIE algorithm, a tree which is for storing each character in each of the character strings (421) may be generated. An example of the tree generated in the 1st stage TRIE algorithm is illustrated in FIG. 6A mentioned below.

In step 413, the computer (101) stores the partial integer arrays (431) into the 2nd stage TRIE to obtain an identifier array (441) comprising an identifier "15" derived from the partial integer array {11}, an identifier "31" derived from the partial integer array {105}, an identifier "25" derived from the partial integer array {77, 12, 7} and an identifier "121" derived from the partial integer array {28, 150}. Accordingly, the identifier array (441) is {15,31,25,121} (494). A variety of TRIE algorithms known in the art may be used for the 2nd stage TRIE, which may be the same as or different from the 1st stage TRIE algorithm. In the 2nd stage TRIE algorithm, a tree which is for storing each integer in each of the partial integer arrays (431) may be generated. An example of the tree generated in the 2nd stage TRIE algorithm is illustrated in FIG. 6B mentioned below.

Figure 6C:
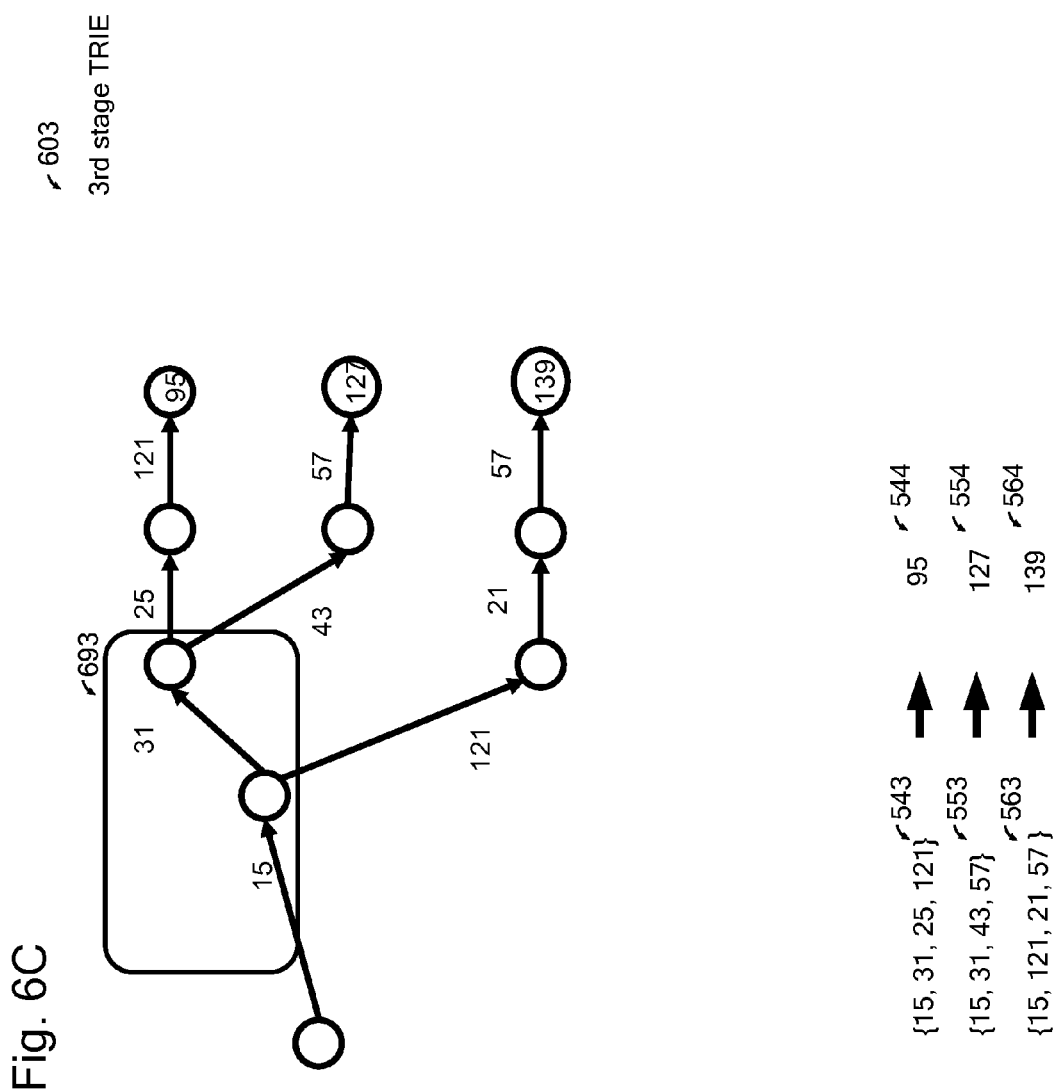
FIG. 6C illustrates an embodiment of a tree generated in a process of the 3rd stage TRIE.

In step 414, the computer (101) stores the identifier array (441) into the 3rd stage TRIE to obtain one identifier (416) of the alignment of attributes for the sentence (491). When the identifier array (441) is {15,31,25,121} (494), one identifier may be "95" (495). Accordingly, one identifier, "95" (495), is obtained as an output. One identifier is obtained such that the identifier, "95" (495), is unique to the sentence in the feature. A variety of TRIE algorithms known in the art can be used for the 3rd stage TRIE, which may be the same as or different from the 1st stage TRIE algorithm and/or the 2nd stage TRIE algorithm. In the 3rd stage TRIE algorithm, a tree which is for storing each integer in the identifier array (441) may be generated. An example of the tree generated in the 3rd stage TRIE algorithm is illustrated in FIG. 6C mentioned below.

In step 416, the computer (101) returns int value as an output of the input. When the sentence is "Lincoln lived in the White House" (491) and the feature function template is "AllWords", the int value, "95" (495), is obtained as the output. The int value is obtained such that the int value, "95" (495), is unique to the sentence in the feature.

In step 417, the computer (101) stores the int value, "95" (495), into a value store, such as a memory (103) or a disk (109).

In step 418, the computer (101) may use the int value, "95" (495), for example, as a key value for extracting information such as an NE (or mention), or relation between the first mention and the second mention, or as a key value for co-occurrence solution in a search target document.

In the embodiment described in FIG. 4, the identification name of the feature function template is stored into the 1st stage TRIE, while storing into the 1st stage TRIE the character string arrays a2, b2 and c2, when different feature function templates are used in each sentence of the document. The use of the identification name of the feature function template may be useful to distinguish a feature function template applied to the sentence.

Figure 5:
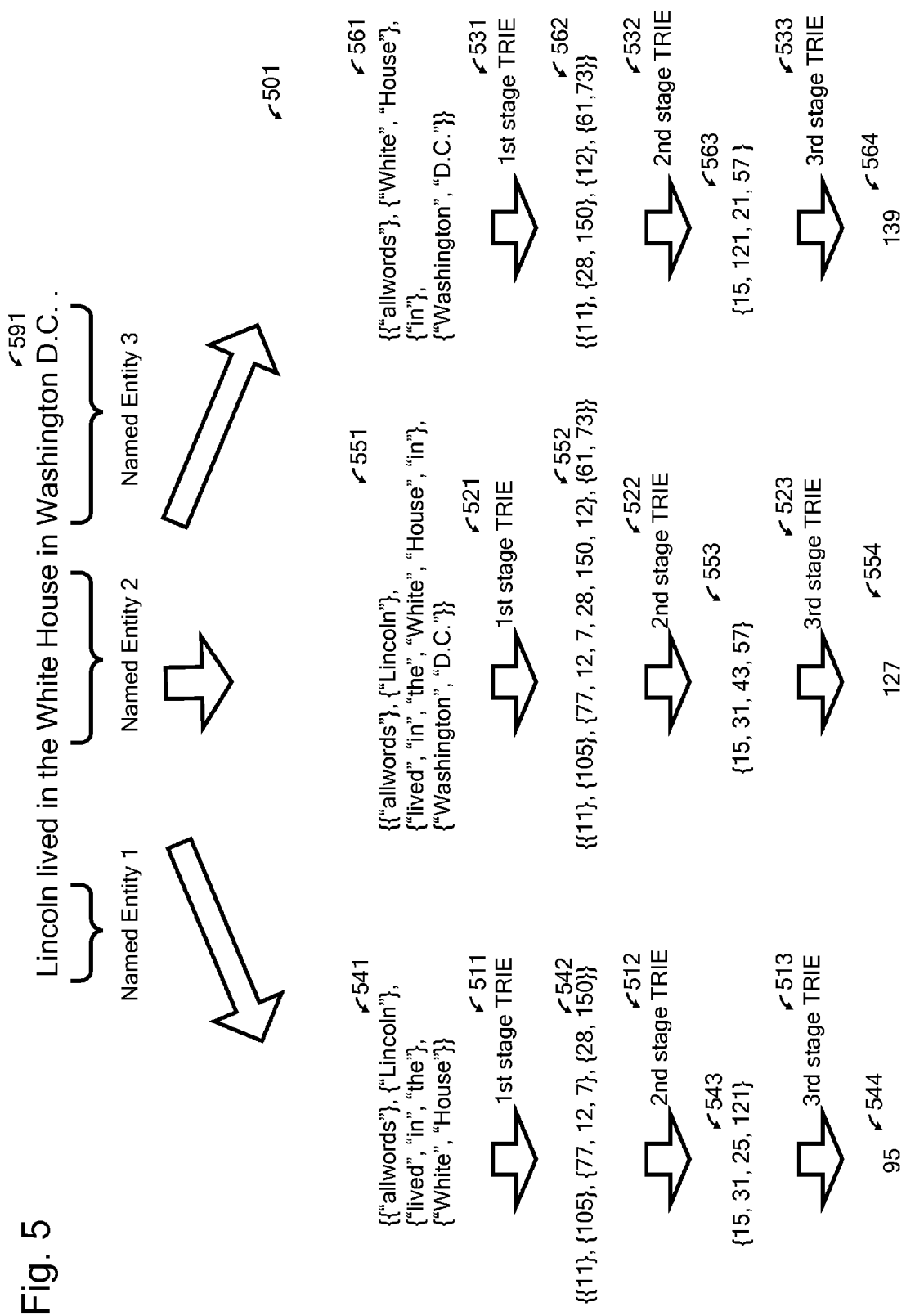
FIG. 5 illustrates an embodiment of a document having three named entities.

With reference to FIG. 5, FIG. 5 illustrates an embodiment of a document (501) having three named entities.

Hereinafter in an explanation of FIG. 5, a sentence selected from a document (501) in a corpus, "Lincoln lived in the White House in Washington D.C." (591), is used. In the sentence (591), there are three NEs: named entity 1 (NE1), named entity 2 (NE2) and named entity 3 (NE3). The named entities 1, 2 and 3 are "Lincoln", "White House" and "Washington D.C.", respectively. A feature function template, "AllWords", is used for extracting a relation between the NEs in the sentence, by using the NEs and inter-entity data.

In a first pair, the feature function template is applied to the named entities 1 and 2 and, therefore, the character string arrays {{"allwords"}, {"Lincoln"}, {"lived", "in", "the"}, {"White", "House"}} (541) are obtained.

In step 511, the computer (101) stores the character string arrays (541) into the 1st stage TRIE to obtain the partial integer arrays (542). The partial integer arrays (542) comprise the partial integer array {11} derived from the an identification name of the feature function template {"allwords"}, the partial integer array 11051 derived from the character string array {"Lincoln"}, the partial integer array {77, 12, 7} derived from the character string array {"lived", "in", "the"}, and the partial integer array {28, 150} derived from the character string array {"White", "House"}.

In step 512, the computer (101) stores the partial integer arrays (542) into the 2nd stage TRIE to obtain the identifier array (543). The identifier array (543) comprises an identifier "15" derived from the partial integer array {11}, an identifier "31" derived from the partial integer array {105}, an identifier "25" derived from the partial integer array {77, 12, 7} and an identifier "121" derived from the partial integer array {28, 150}.

In step 513, the computer (101) stores the identifier array (543) into the 3rd stage TRIE to obtain one identifier (544) of the alignment of attributes for the sentence (591). One identifier is "95" (544). One identifier "95" (544) may be the same as the identifier "95" (495) described in FIG. 4, because the identifier array, {15,31,25,121} (543), is the same as the identifier array, {15,31,25,121} (494) described in FIG. 4.

In a second pair, the feature function template may be applied to the named entities 1 and 3 and, therefore, the character string arrays {{"allwords"}, {"Lincoln"}, {"lived", "in", "the", "White", "House", "in"}, {"Washington", "D.C."}}(551) are obtained.

In step 521, the computer (101) stores the character string arrays (551) into the 1st stage TRIE to obtain the partial integer arrays (552). The partial integer arrays (552) comprise the partial integer array {11} derived from the character string array {"allwords"}, the partial integer array 11051 derived from the character string array {"Lincoln"}, the partial integer array {77,12,7,28,150,12} derived from the character string array {"lived", "in", "the", "White", "House", "in"}, and the partial integer array {61,73} derived from the character string array {"Washington", "D.C."}.

In step 522, the computer (101) stores the partial integer arrays (552) into the 2nd stage TRIE to obtain the identifier array (553). The identifier array (553) comprises an identifier "15" derived from the partial integer array {111}, an identifier "31" derived from the partial integer array 1105, an identifier "43" derived from the partial integer array {77, 12,7,28,150,12} and an identifier "57" derived from the partial integer array {61,73}.

In step 523, the computer (101) stores the identifier array (553) into the 3rd stage TRIE to obtain one identifier (554) of the alignment of attributes for the sentence (591). One identifier is "127" (554).

In a third pair, the feature function template is applied to the named entities 2 and 3 and, therefore, the character string arrays {{"allwords"}, {"White", "House"}, {"in"}, {"Washington", "D.C."}} (561) are obtained.

In step 531, the computer (101) stores the character string arrays (561) into the 1st stage TRIE to obtain the partial integer arrays (562). The partial integer arrays (562) comprises the partial integer array {11} derived from the character string array {"allwords"}, the partial integer array {28,150} derived from the character string array {"White", "House"}, the partial integer array {12} derived from the character string array {"in"}, and the partial integer array {61,73} derived from the character string array {"Washington", "D.C."}.

In step 532, the computer (101) stores the partial integer arrays (562) into the 2nd stage TRIE to obtain the identifier array (563). The identifier array (563) comprises an identifier "15" derived from the partial integer array {11}, an identifier "121" derived from the partial integer array {28, 150}, an identifier "21" derived from the partial integer array {12} and an identifier "57" derived from the partial integer array {61,73}.

In step 533, the computer (101) stores the identifier array (563) into the 3rd stage TRIE to obtain one identifier (564) of the alignment of attributes for the sentence (591). One identifier is "139" (564).

When the character string array having the same character string is stored into the 1st stage TRIE, the same int value is assigned to the character string array obtained. Further, when the partial integer array having the same int value is stored into the 2nd stage TRIE, the same int value is assigned to the identifier obtained.

With reference to FIG. 6B, FIG. 6B illustrates an embodiment of a tree generated in a process of the 2nd stage TRIE.

FIGS. 6A to 6C illustrate embodiments of a tree generated in a process of the 1st, 2nd and 3rd stage TRIEs, respectively. In FIGS. 6A to 6C, an example for efficiently storing a character or integer into the Tree is shown.

Hereinafter in an explanation of FIGS. 6A to 6C, a sentence selected from a document in a corpus, "Lincoln lived in the White House in Washington D.C." (591) described in FIG. 5 is used. A feature function template, "AllWords", is used for extracting a relation between the NEs in the sentence, by using the NEs and inter-entity data.

The sentence (591) described in FIG. 5 is used for an explanation of FIGS. 6A to 6C. "Lincoln lived in the White House in Washington D.C." (591). According to the first, second and third pairs, the character string arrays {{"allwords"}, {"Lincoln"}, {"lived", "in", "the"}, {"White", "House"}} (541), {{"allwords"}, {"Lincoln"}, {"lived", "in", "the", "White", "House", "in"}, {"Washington", "D.C."}}(551) and {{"allwords"}, {"White", "House"}, {"in"}, {"Washington", "D.C."}} (561) are prepared.

With reference to FIG. 6A, FIG. 6A illustrates an embodiment of a tree generated in a process of the 1st stage TRIE.

The computer (101) may store the character string arrays (541), (551) and (561) into the 1st stage TRIE to obtain the partial integer arrays (542), (552) and (562), respectively.

The tree (601) shows that "White" and "Washington" share a prefix word, "W" (691). Accordingly, when the same element such as prefix word is commonly appeared among the character string arrays, an edge assigned to the same prefix or character may be shared among the character string arrays. Therefore, a memory size may be reduced.

The computer (101) may store the partial integer arrays (542), (552) and (562) into the 2nd stage TRIE to obtain the identifier arrays (543), (553) and (563), respectively.

The tree (602) shows that "77", "12" and "7" are commonly appeared among {77, 12, 7} in the partial integer arrays (542) and {77, 12, 7, 28, 150, 12} in the partial integer arrays (552). Accordingly, when the same element such as int value is commonly appeared among the partial integer arrays, an edge (692) assigned to the same int value may be shared among the partial integer arrays. Therefore, a memory size can be reduced.

With reference to FIG. 6C, FIG. 6C illustrates an embodiment of a tree generated in a process of the 3rd stage TRIE.

The computer (101) may store the identifier arrays (543), (553) and (563) into the 3rd stage TRIE to obtain the identifier (544), (554) and (564), respectively.

The tree (603) shows that "15" is commonly appeared among {15,31,25,121} (543), {15,31,43,57} (553) and {15, 121,21,57} (563). Further, the tree shows that "15" and "31" are commonly appeared among {15,31,25,121} (543) and {15,31,43,57} (553). Accordingly, when the same element such as int value is commonly appeared among the identifier arrays an edge (693) assigned to the same int value is shared among the identifier arrays. Therefore, a memory size may be reduced.

Figure 7:
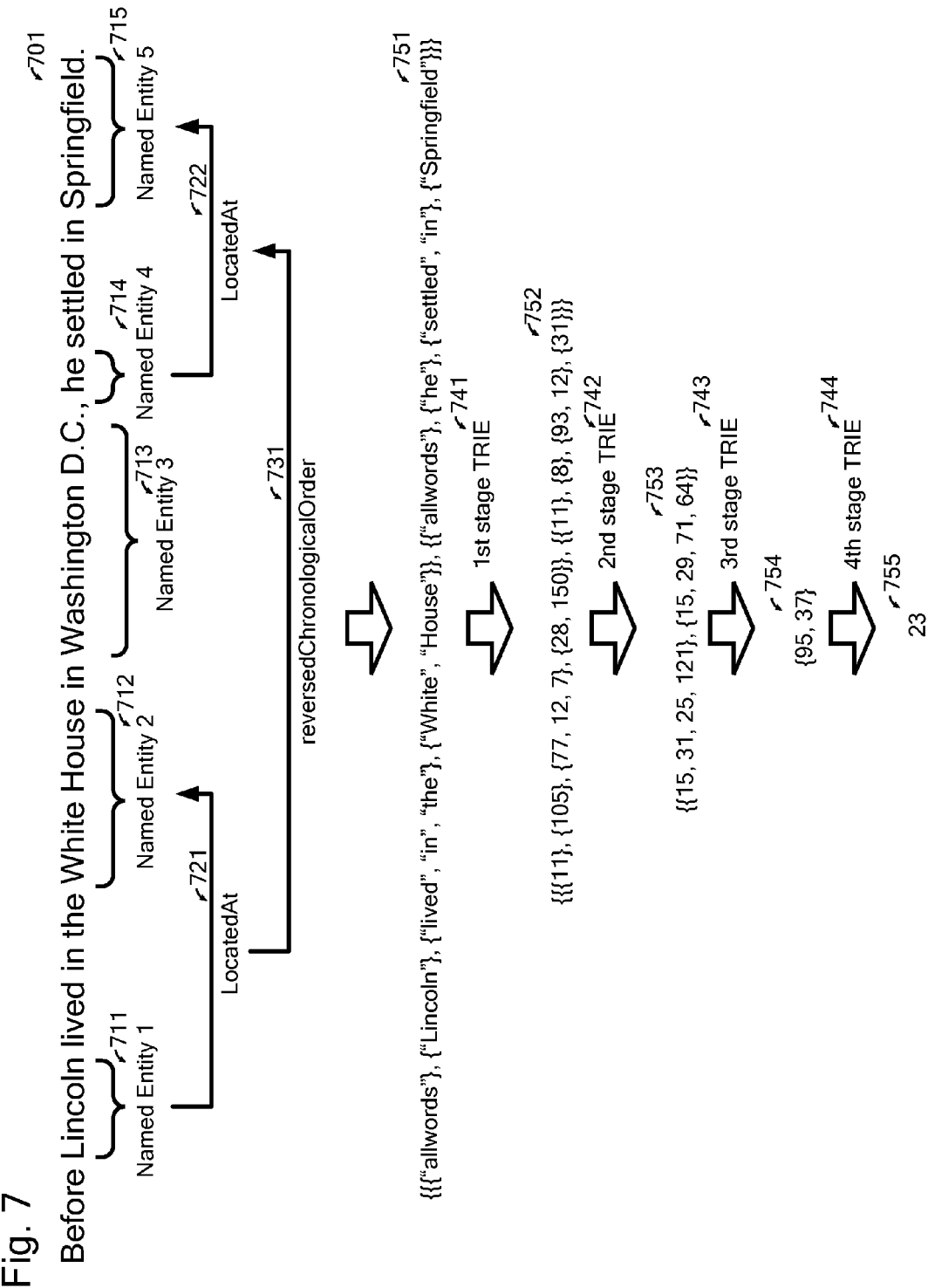
FIG. 7 illustrates an embodiment of a quadruple stages TRIE data structure.

With reference to FIG. 7, FIG. 7 illustrates an embodiment of a quadruple stages TRIE data structure.

When a meta-relation between relation occurs, an additional stage TRIE or 4th stage TRIE may be further added to the triple stages TRIE and, therefore, a quadruple stages TRIE data structure will be used. For an embodiment implementation of each of the 1st, 2nd, 3rd and 4th stages TRIE in the embodiment of the quadruple stages TRIE, each stage TRIE is implemented as, for example, a double-array TRIE, as mentioned above.

Hereinafter in an explanation of FIG. 7, a sentence selected from a document in a corpus, "Before Lincoln lived in the White House in Washington D.C., he settled in Springfield." (701), is used. In the sentence (701), there are five NEs: named entity 1, named entity 2, named entity 3, named entity 4 and named entity 5. The named entities 1 (711), 2 (712), 3 (713), 4 (714) and 5 (715) are "Lincoln", "White House", "Washington D.C.", "he" and "Springfield.", respectively. A feature function template, "AllWords", is used for extracting a relation between the NEs in the sentence, by using the NEs and inter-entity data. In the sentence (701), there are two relations: LocatedAt (721) between the named entity 1 (711) and the named entity 2 (712); and LocatedAt (722) between the named entity 4 (714) and the named entity 5 (715). In the sentence (701), there is further relation: reversedChronologicalOrder (731), which is a virtual meta-relation between the LocatedAt (721) and LocatedAt (722).

The feature function template is further applied to two pairs of the NEs in the sentence (701) and, therefore, the character string arrays {{{"allwords"}, {"Lincoln"}, {"lived", "in", "the"}, {"White", "House"}}, {{"allwords"}, {"he"}, {"settled", "in"}, {"Springfield"}}} (751) are obtained.

In step 741, the computer (101) may store the character string arrays (751) into the 1st stage TRIE to obtain the partial integer arrays (752). The partial integer arrays (752) comprise a first set of partial integer arrays {{11}, {105}, {77,12,7}, {28,150}} and a second set of partial integer arrays {{11}, {8}, {93,12}, {31}}. The first set of partial integer arrays comprise the partial integer array {11} derived from the an identification name of the feature function template {"allwords"}, the partial integer array {105} derived from the character string array {"Lincoln"}, the partial integer array {77,12,7} derived from the character string array {"lived", "in", "the"}, and the partial integer array {28,150} derived from the character string array {"White", "House"}. The second set of partial integer arrays comprise the partial integer array {11} derived from the an identification name of the feature function template {"allwords"}, the partial integer array {8} derived from the character string array {he"}, the partial integer array {93, 12} derived from the character string array {"settled", "in"}, and the partial integer array 1311 derived from the character string array {"Springfield"}.

In step 742, the computer (101) may store the partial integer arrays (752) into the 2nd stage TRIE to obtain the partial integer arrays (753). The partial integer arrays (753) comprise a first set of partial integer array {15,31,25,121} and a second set of partial integer array {15,29,71,64}. The first set of partial integer array comprise a first element "15" derived from the partial integer array {11}, a second element "31" derived from the partial integer array {105}, a third element "25" derived from the partial integer array {77,12, 7} and a fourth element "121" derived from the partial integer array {28,150}. The second set of partial integer array comprise a first element "15" derived from the partial integer array {11}, a second element "29" derived from the partial integer array {8}, a third element "71" derived from the partial integer array {93,12} and a fourth element "64" derived from the partial integer array {31}. As seen in the first element "15" derived from the partial integer array {11} in the first set of partial integer arrays and the first element "15" derived from the partial integer array {11} in the second set of partial integer arrays, the same value "15" is obtained each from the partial integer arrays having the same attribute {11}.

In step 743, the computer (101) may store the partial integer arrays (753) into the 3rd stage TRIE to obtain the identifier array (754). The identifier array (754) comprises an identifier "95" derived from the first set of partial integer array {15,31,25,121}, and an identifier "37" derived from the second set of partial integer array {15,29,71,64}.

In step 744, the computer (101) may store the identifier array (754) into the 4th stage TRIE to obtain one identifier (755) of the alignment of attributes for the sentence (701). One identifier is "23" (755), derived from the identifier array {92,37} (754).

In the embodiment described in FIG. 7, the quadruple stages TRIE data structure allows efficiently storing int values.

FIGS. 8A to 8F illustrate a flowchart of an embodiment of the present disclosure.

Figure 8A:
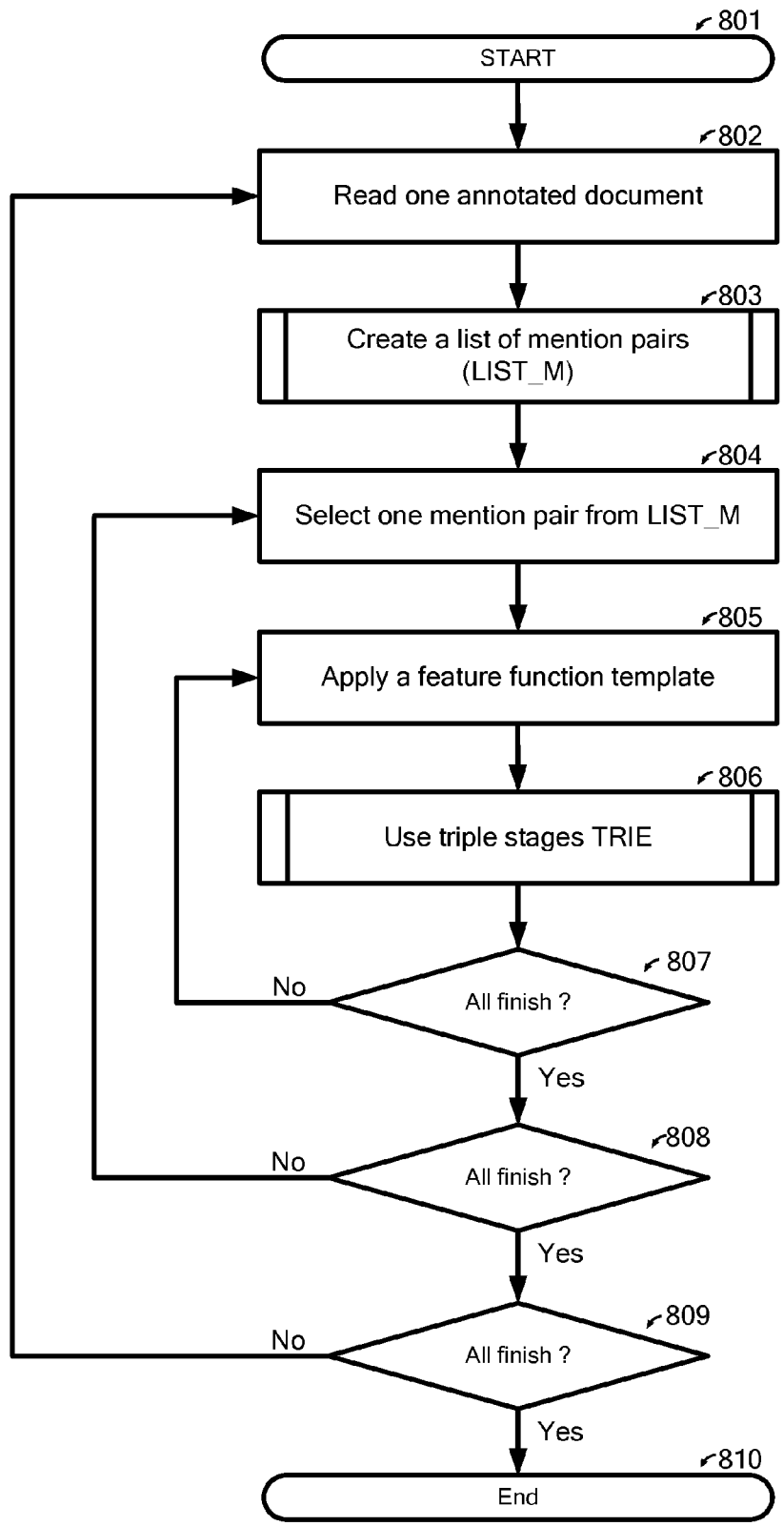
FIG. 8A illustrates an embodiment of an overall flowchart for assigning an identifier to an alignment of attributes extracted from a pair of mentions in an annotated corpus.

With reference to FIG. 8A, FIG. 8A illustrates an embodiment of an overall flowchart for generating a feature at the time of information extraction. The embodiment comprises a method for assigning an identifier to an alignment of attributes extracted from a pair of mentions in an annotated corpus.

In step 801, the computer (101) starts the process for assigning an identifier to an alignment of attributes extracted from a pair of mentions in an annotated corpus.

In step 802, the computer (101) may read one annotated document from a corpus. The corpus comprises a plurality of annotated documents. The detailed explanation of the step 802 will be illustrated in FIG. 8B mentioned below.

In step 803, the computer (101) may create a list of mention pairs as a LIST_M. The sentence in the document has location information such as "begin" and "end". Further, the mention has location information such as "begin" and "end". Accordingly, on the basis of the location information of the sentence, the computer (101) may extract mentions in the range of the sentence.

Further, the computer (101) may extract mentions from an attribute of a token in the sentence. The attribute may be a character string of the token itself, a part of speech of the token, a suffix of the token, a type of a character string of the token, the beginning of a character string of the token being an uppercase letter, or all character strings of a token being uppercase or lower case letters. The type of a character string of the token may be an alphabet, Kanji (or Chinese character), Hiragana (or Japanese syllabary characters), Katakana, or numeric character.

In step 804, the computer (101) may select one mention pair from the LIST_M.

In step 805, the computer (101) may apply a feature function template with the selected mention pair (e.g., mention 1 and mention 2), and one or more neighborhood tokens relating the selected mention pair to generate a feature function. The feature function template may be selected from any feature function template, for example, but not limited to, "AllWords", "allpos", "allprefixes" or "allsuffixes". The detailed explanation of the feature function templates will be illustrated in FIG. 9 mentioned below. The generated feature function comprises one or more attributes wherein each attribute is for each of the one or more tokens included in the first mention, one or more attributes wherein each attribute is for each of the one or more tokens included in the second mention, and one or more attributes wherein each attribute is for each of the one or more neighborhood tokens. The neighborhood token may be located inside the mentions or outside of each of the mention pair. The neighborhood token located inside the mentions may be inter-token between the mention pair. The neighborhood token located outside of each of the mention pair is a token appearing prior to the mention 1 in a sentence of the document, or a token appearing posterior to the mention 2 in the sentence of the document.

In step 806, the computer (101) may use triple stages TRIE and processes the character string arrays. The detailed explanation of the step 806 will be illustrated in FIG. 8C mentioned below.

In step 807, the computer (101) may judge whether or not there remain one or more templates which are to be applied to the selected mention pair and one or more neighborhood tokens. If all of the templates are already applied to the selected mention pair and one or more neighborhood tokens, the computer (101) proceeds with the process of a step 808. Meanwhile, if there remain one or more templates which are to be applied to the selected mention pair and one or more neighborhood tokens, the computer (101) may return the process to the step 805 and repeats the steps 805 to 807.

In step 808, the computer (101) may judge whether or not there remain one or more pairs which are not processed. If all of the pairs are already processed, the computer (101) proceeds with the process of a step 809. Meanwhile, if there remain one or more pairs which are not processed, the computer (101) returns the process to the step 804 and repeats the steps 804 to 808.

In step 809, the computer (101) may judge whether or not there remain one or more annotated documents which are not processed. If all of the annotated documents are already processed, the computer (101) proceeds with the process of a final step 810. Meanwhile, if there remain one or more annotated documents which are not processed, the computer (101) returns the process to the step 802 and repeats the steps 802 to 809.

In step 810, the computer (101) terminates the process mentioned above.

Figure 8B:
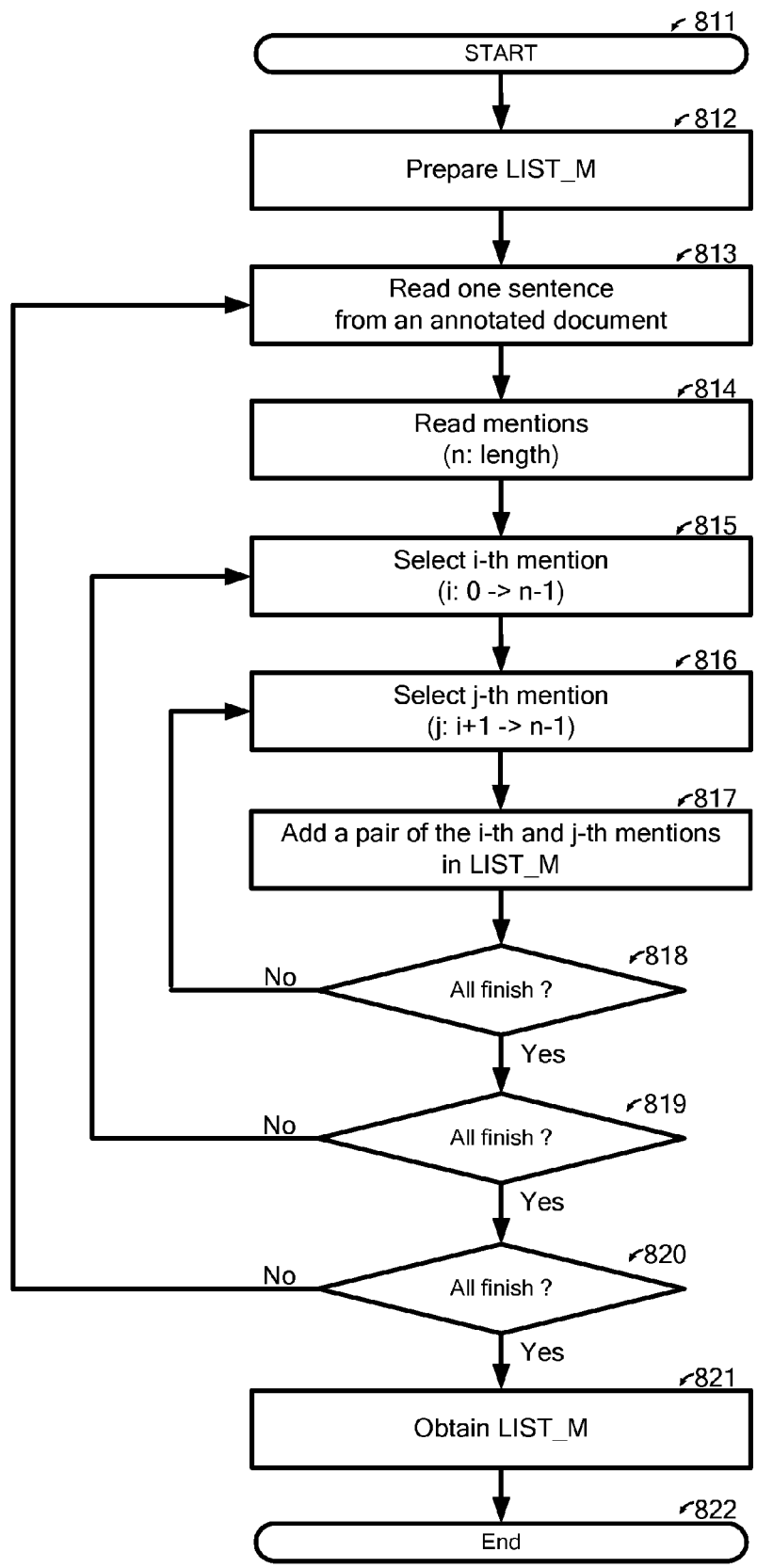
FIG. 8B illustrates an embodiment of a flowchart for creating a list of mention pairs.

With reference to FIG. 8B, FIG. 8B illustrates an embodiment of a flowchart for creating a list of mention pairs.

In step 811, the computer (101) starts the process for creating a list of mention pairs.

In step 812, the computer (101) may prepare a LIST_M in a storage, such as a memory (103) or a disk (109).

In step 813, the computer (101) may read one sentence from an annotated document.

In step 814, the computer (101) may read mentions in the selected sentence. The number of the pair of mentions is represented as n (n: length). In the embodiment described in FIG. 5, there are three pairs of mentions: (NE1, NE2), (NE1, NE3) and (NE2, NE3). Accordingly, the n (length) is three.

In step 815, the computer (101) may select i-th mention among the read mentions, in which i refer to 0→n−1.

In step 816, the computer (101) may select j-th mention among the read mentions, in which j refer to i+1→n−1.

In step 817, the computer (101) may make a pair of mentions from the selected i-th and j-th mentions to add the pair of the i-th and j-th mentions in the LIST_M.

In step 818, the computer (101) may judge whether or not there remains one or more unselected j-th mentions. If all of the j-th mentions are already processed, the computer (101) proceeds with the process of a step 819. Meanwhile, if there remain one or more unselected j-th mentions, the computer (101) returns the process to the step 816 and repeats the steps 816 to 818.

In step 819, the computer (101) may judge whether or not there remains one or more unselected i-th mentions. If all of the i-th mentions are already processed, the computer (101) proceeds with the process of a step 820. Meanwhile, if there remain one or more unselected i-th mentions, the computer (101) returns the process to the step 815 and repeats the steps 815 to 819.

In step 820, the computer (101) may judge whether or not there remain one or more unread sentences. If all of the sentences are already processed, the computer (101) proceeds with the process of a step 821. Meanwhile, if there remain one or more unread sentences, the computer (101) returns the process to the step 813 and repeats the steps 813 to 820.

In step 821, the computer (101) may obtain the LIST_M in which all of the pair of the mentions are listed.

In step 822, the computer (101) terminates the process mentioned above.

Figure 8C:
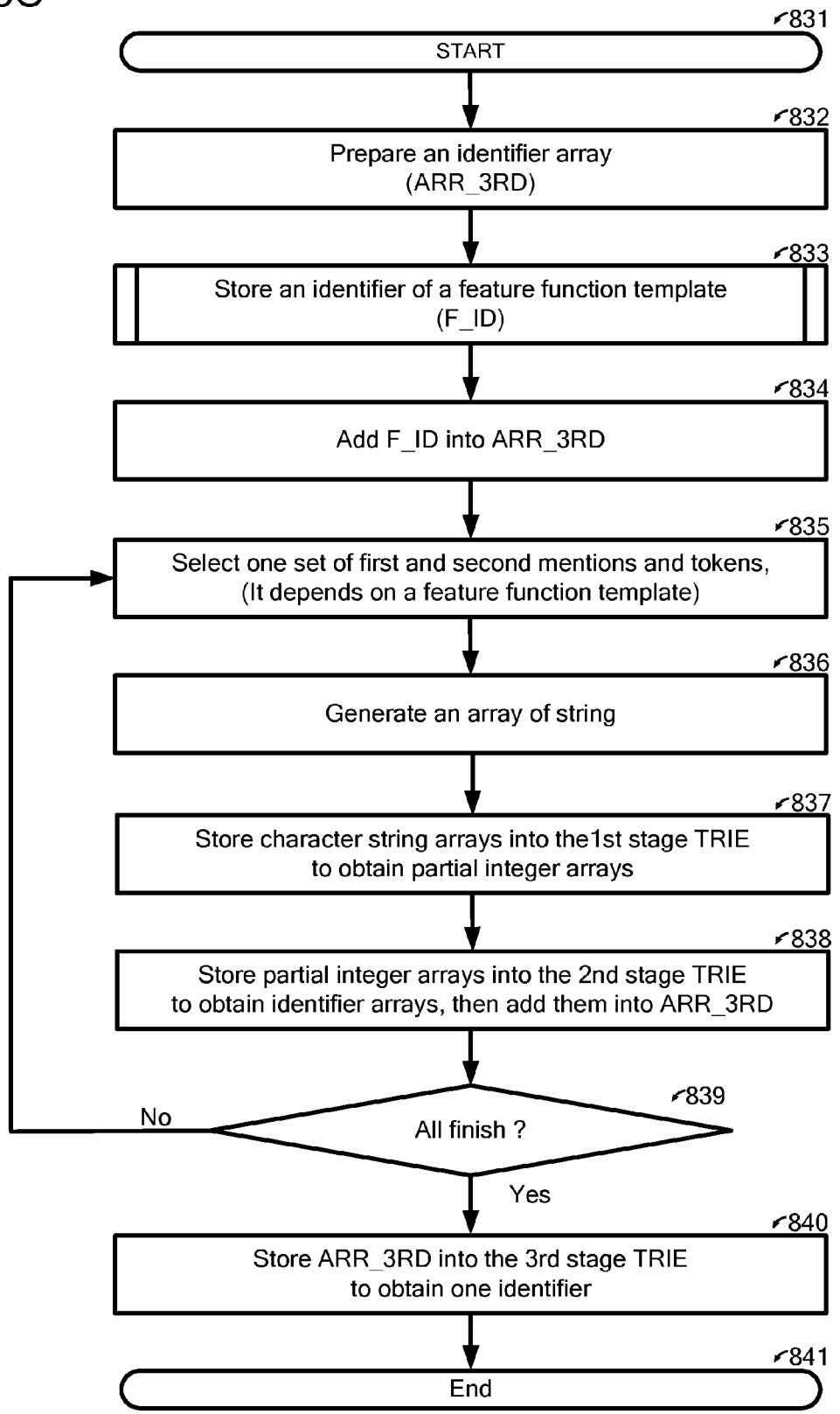
FIG. 8C illustrates an embodiment of a flowchart for using a triple stages TRIE.

With reference to FIG. 8C, FIG. 8C illustrates an embodiment of a flowchart for using a triple stages TRIE.

In step 831, the computer (101) starts the process for using a triple stages TRIE.

In step 832, the computer (101) may prepare an identifier array as ARR_3RD. The ARR_3RD is used in a 3rd stage TRIE.

In an optional step 833, the computer (101) may store into the 1st stage TRIE an identifier of a feature function template, F_ID, which is used in step 805. The detailed explanation of the step 833 will be illustrated in FIG. 8D mentioned below. The example of storing an identifier of a feature function is illustrated in FIG. 4.

In an optional step 834, the computer (101) may add F_ID into ARR_3RD.

In step 835, the computer (101) may select one set of mention pair, namely first and second mentions, and one or more neighborhood tokens relating the mention pair. The set depends on a feature function template used.

In step 836, the computer (101) may generate an array of string by using the selected set of the first and second mentions and one or more neighborhood tokens.

In step 837, the computer (101) may store character string arrays into the 1st stage TRIE to obtain partial integer arrays. The character string arrays comprise a character string array A including one or more character strings each representing an attribute of each of one or more tokens included in a first mention in the document, a character string array B including one or more character strings each representing an attribute of each of one or more tokens included in a second mention in the document, and a character string array C including one or more character strings each representing an attribute of each of one or more neighborhood tokens neighboring the first mention or the second mention. The partial integer arrays comprise a partial integer array K including one or more identifiers wherein each identifier is for an attribute of each of one or more tokens included in the first mention, a partial integer array L including one or more identifiers wherein each identifier is for an attribute of each of one or more tokens included in the second mention, and a partial integer array M including one or more identifiers wherein each identifier is for an attribute of each of the one or more neighborhood tokens.

In step 838, the computer (101) may store the obtained partial integer arrays into the 2nd stage TRIE to obtain identifier arrays. The identifier arrays comprise an identifier array X including an identifier of the first mention, an identifier of the second mention, and an identifier of the one or more neighborhood tokens. After obtaining of the identifier arrays, the computer (101) may add the identifier arrays into ARR_3RD.

In step 839, the computer (101) may judge whether or not there remains one or more sets which are not processed. If all of the sets are already processed, the computer (101) proceeds with the process of a step 840. If there remain one or more sets which are not processed, the computer (101) returns the process to the step 835 and repeats the steps 835 to 839.

In step 840, the computer (101) may store ARR_3 RD into the 3rd stage TRIE to obtain one identifier of the alignment of attributes extracted from a pair of mentions in an annotated corpus.

In step 841, the computer (101) terminates the process mentioned above.

Figure 8D:
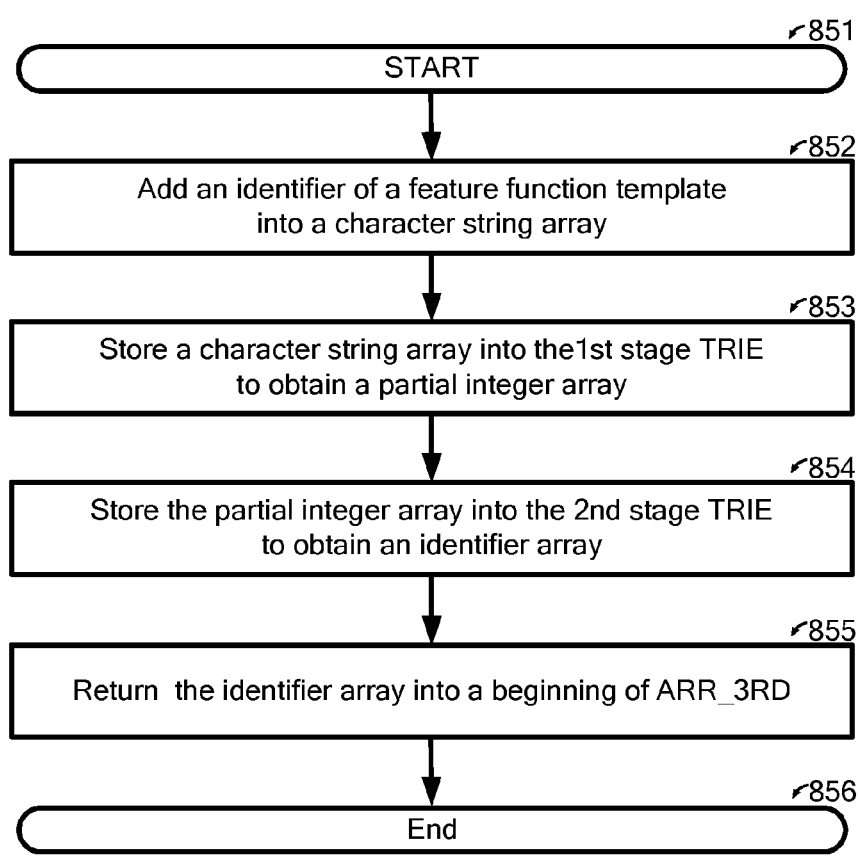
FIG. 8D illustrates an embodiment of a feature flowchart for storing an identifier of a feature function template.

With reference to FIG. 8D, FIG. 8D illustrates an embodiment of a feature flowchart for storing an identifier of a feature function template.

In step 851, the computer (101) starts the process for storing an identifier of a feature function template.

In step 852, the computer (101) may add an identifier of a feature function template into a character string array.

In step 853, the computer (101) may store a character string array representing an identification name of the template into the 1st stage TRIE to obtain a partial integer array.

In step 854, the computer (101) may store the partial integer array into the 2nd stage TRIE to an obtain identifier array.

In step 855, the computer (101) may return the identifier array into a beginning of ARR_3RD.

In step 856, the computer (101) terminates the process mentioned above.

Figure 8E:
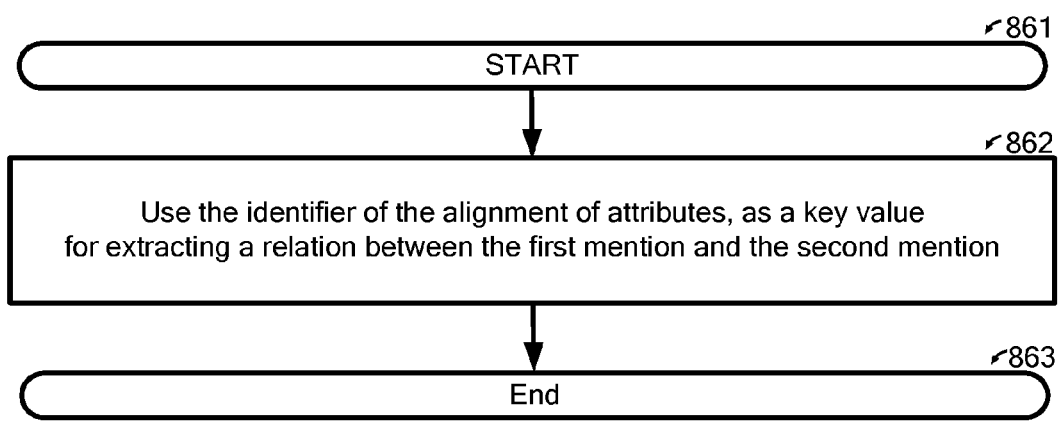
FIG. 8E illustrates an embodiment of a flowchart for using an identifier of an alignment of attributes.

With reference to FIG. 8E, FIG. 8E illustrates an embodiment of a flowchart for using an identifier of an alignment of attributes.

In step 861, the computer (101) starts the process for using an identifier of an alignment of attributes extracted from a pair of mentions, as a key value for extracting a relation between mentions. The process is performed when information extraction is performed. The information may be for example, but not limited to, a named entity or relation.

In step 862, the computer (101) may use an identifier of an alignment of the attributes, as a key value for extracting a relation between the first mention and the second mention.

In step 863, the computer (101) terminates the process mentioned above.

Figure 8F:
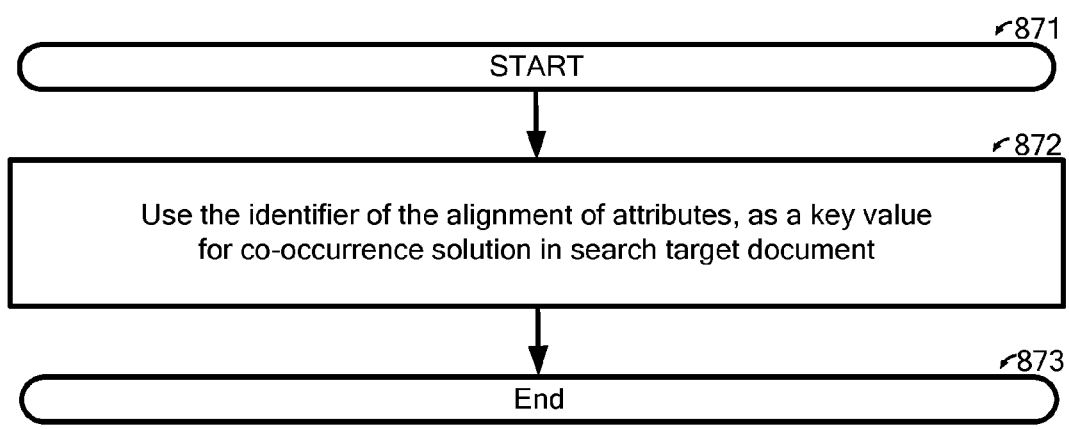
FIG. 8F illustrates another embodiment of a flowchart for using an identifier of an alignment of attributes.

With reference to FIG. 8F, FIG. 8F illustrates another embodiment of a flowchart for using an identifier of an alignment of attributes.

In step 871, the computer (101) starts the process for using an identifier of an alignment of attributes extracted from a pair of mentions, as a key value for co-occurrence solution in a search target document. The process is performed when information extraction is performed.

In step 872, the computer (101) may use an identifier of an alignment of the attributes, as a key value for co-occurrence solution in a search target document.

In step 873, the computer (101) terminates the process mentioned above.

Figure 9:
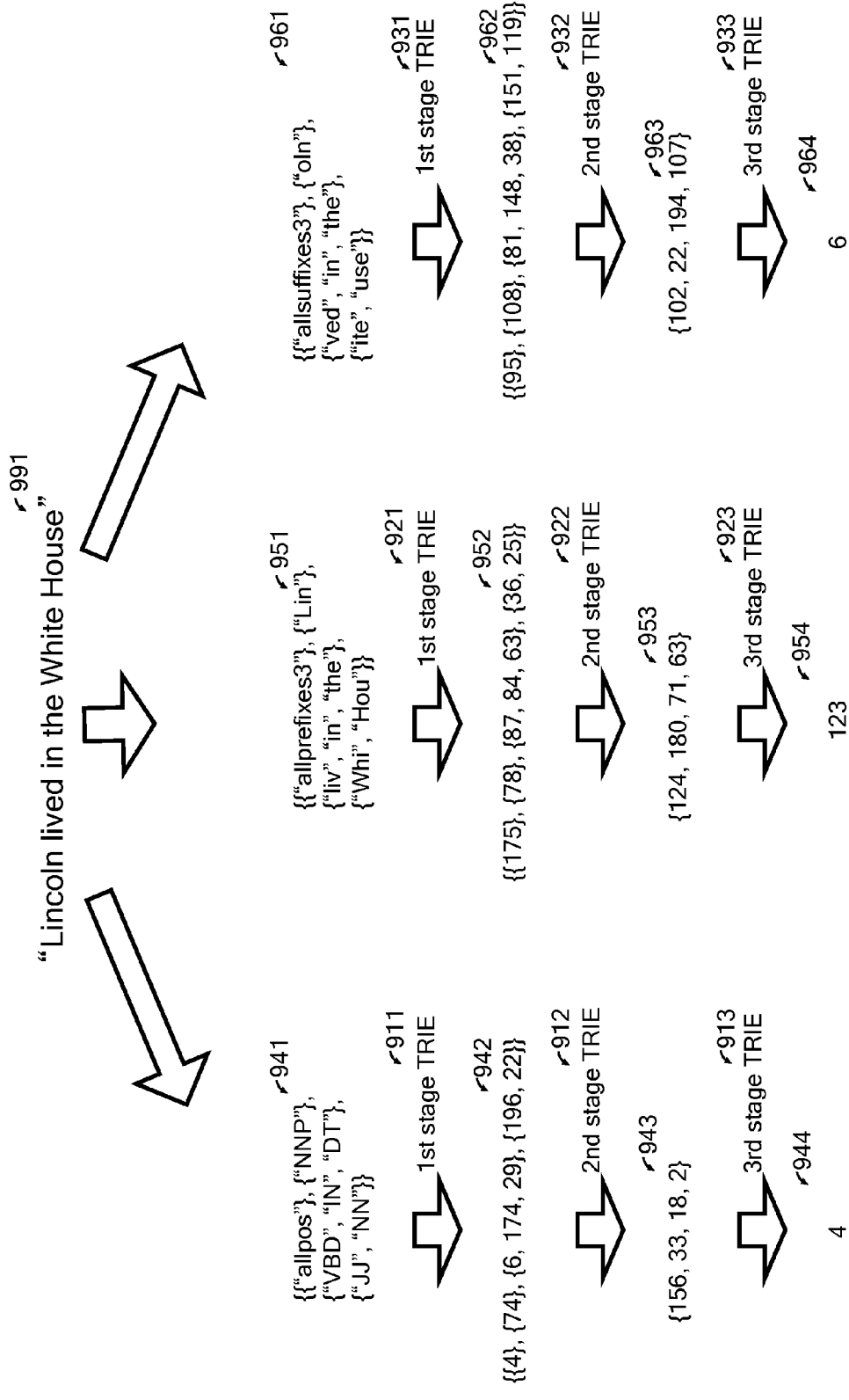
FIG. 9 illustrates embodiments of a variety of feature function templates.

FIG. 9 illustrates embodiments of a variety of feature function templates.

In an embodiment of the present disclosure a variety of feature function templates can be used other than "All-Words". For example, but not limited to, "allpos", "allprefixes" and "allsuffixes" may be also used.

The feature function template, "allpos", is used for arranging Part-Of-Speech tags for tokens.

The feature function template, "allprefixes", is used for arranging prefixes in tokens. A length of the token may be added to an identification name of the feature function template, such as allprefixesX, in which X means the length of the token.

The feature function template, "allsuffixes", is used for arranging suffixes in tokens. A length of the token may be added to an identification name of the feature function template, such as allsuffixesY, in which Y means the length of the token.

Hereinafter in an explanation of the feature templates, a sentence selected from a document in a corpus, "Lincoln lived in the White House." (991), is used. In the sentence (991), there are two NEs: named entity 1 and named entity 2. The named entities 1 and 2 are "Lincoln" and "White House", respectively.

Steps 911 to 913 illustrate an embodiment wherein the feature function template, "allpos", is used for extracting a relation between the NEs in the sentence, by using the NEs and inter-entity data. The generated character string arrays (941) is {{"allpos"}, {"NNP"}, {"VBD", "IN", "DT"}, {"JJ", "NN"}}. The Part-Of-Speech tags, "NNP", "VBD", "IN", "DT", "JJ" and "NN", mean "Proper noun, singular", "Verb, past tense", "Preposition or subordinating conjunction", "Determiner", "Adjective", and "Noun, singular or mass", respectively.

In step 911, the computer (101) may store the character string arrays (941) into the 1st stage TRIE to obtain the partial integer arrays (942). The partial integer arrays (942) comprise the partial integer array {4} derived from the an identification name of the feature function template {"allpos"}, the partial integer array {74} derived from the character string array {"NNP"}, the partial integer array {6,174,29} derived from the character string array {"VBD", "IN", "DT"}, and the partial integer array {196, 22} derived from the character string array {"JJ", "NN"}.

In step 912, the computer (101) may store the partial integer arrays (942) into the 2nd stage TRIE to obtain the identifier array (943). The identifier array (943) comprises an identifier "156" derived from the partial integer array {4}, an identifier "33" derived from the partial integer array {74}, an identifier "18" derived from the partial integer array {"6", "174", "29"} and an identifier "2" derived from the partial integer array {196, 22}.

In step 913, the computer (101) may store the identifier array (943) into the 3rd stage TRIE to obtain one identifier, "4", (944) of the alignment of attributes for the sentence (991).

Steps 921 to 923 illustrate an embodiment wherein the feature function template, "allprefixes", is used for extracting a relation between the NEs in the sentence, by using the NEs and inter-entity data. The generated character string arrays (951) is {{"allprefixes3"}, {"Lin"}, {"liv", "in", "the"}, {"Whi", "Hou"}}.

In step 921, the computer (101) may store the character string arrays (951) into the 1st stage TRIE to obtain the partial integer arrays (952). The partial integer arrays (952) comprise the partial integer array {175} derived from the an identification name of the feature function template {"allprefix3"}, the partial integer array {78} derived from the character string array {"Lin"}, the partial integer array {87,84,63} derived from the character string array {"liv", "in", "the"}, and the partial integer array {36,25} derived from the character string array {"Whi", "Hou"}.

In step 922, the computer (101) may store the partial integer arrays (952) into the 2nd stage TRIE to obtain the identifier array (953). The identifier array (953) comprises an identifier "124" derived from the partial integer array {175}, an identifier "180" derived from the partial integer array {78}, an identifier "71" derived from the partial integer array {87,84,63} and an identifier "63" derived from the partial integer array {36,25}.

In step 923, the computer (101) may store the identifier array (953) into the 3rd stage TRIE to obtain one identifier, "123", (954) of the alignment of attributes for the sentence (991).

Steps 931 to 933 illustrate an embodiment wherein the feature function template, "allsuffixes", is used for extracting a relation between the NEs in the sentence, by using the NEs and inter-entity data. The generated character string arrays (961) is {{"allsuffixes3"}, {"oln"}, {"ved", "in", "the"}, {"ite", "use"}}.

In step 931, the computer (101) may store the character string arrays (961) into the 1st stage TRIE to obtain the partial integer arrays (962). The partial integer arrays (962) comprise the partial integer array {95} derived from the an identification name of the feature function template {"allsuffixes3"}, the partial integer array {108} derived from the character string array {"oln"}, the partial integer array {81,148,38} derived from the character string array {"ved", "in", "the"}, and the partial integer array {151,119} derived from the character string array {"ite", "use"}.

In step 932, the computer (101) may store the partial integer arrays (962) into the 2nd stage TRIE to obtain the identifier array (963). The identifier array (963) comprises an identifier "102" derived from the partial integer array {95}, an identifier "22" derived from the partial integer array {108}, an identifier "194" derived from the partial integer array {81,148,38} and an identifier "107" derived from the partial integer array {151,119}.

In step 933, the computer (101) may store the identifier array (963) into the 3rd stage TRIE to obtain one identifier, "6", (964) of the alignment of attributes for the sentence (991).

According to a type of a feature function template, a different identifier may be obtained from the same sentence (991).

FIG. 10 illustrates an embodiment of a flowchart for extracting information using an embodiment of the present disclosure.

Embodiments of the present disclosure may be used in an extraction of the information from the corpus.

In step 1001, the computer (101) may read a document (1031) from a corpus which comprising annotated documents and divides the annotated documents into test data and learning data such that the test data and learning data are not overlapped.

(For Learning)

In step 1021, the computer (101) may generate, by using a feature function template, a key or character string arrays (1032) from the sentence obtained from the learning data.

In step 1022, the computer (101) may generate one identifier (1033) from each of the character string arrays (1032) with a triple stages TRIE.

In step 1023, the computer (101) may construct model (alternatively, feature or features) (1034) by using the obtained identifier (1033). The model may be a set of the weighted features. The feature (1034) illustrates a feature weighted by learning. The value after a relation refers to a weight of each of relations between mentions in each of the obtained identifier. In a case of the identifier "71", the relation between mentions, namely "Lincoln" and "White House" may be "LOCATED_AT", according to the weight of "0.8". In a case of the identifier "105", the relation between mentions, namely "Legislators" and "Washington, D.C." may be "EMPLOYED_BY", according to the weight of "0.7".

(For Tests)

In step 1011, the computer (101) may generate, by using a feature function template, a key or character string arrays (1032) from the sentence obtained from the test data.

In step 1012, the computer (101) may generate one identifier from each of the character string arrays with a triple stages TRIE.

(For Evaluation)

In step 1002, the computer (101) may evaluate a test sentence by using the model.

FIG. 11 illustrates an embodiment of an overall functional block diagram of a computer system hardware used in accordance with the embodiment of the flowcharts described in FIGS. 8A to 8D.

A computer (1101) may correspond to the computer (101).

The computer (1101) comprises a reading section (1111), a mention generating section (1112) and a TRIE section (1113).

The reading section (1111) may read one annotated document from an annotated corpus (1191).

The reading section (1111) may perform the step 802 descried in FIG. 8A.

The mention generating section (1112) may read a feature function template (1192) and apply the feature function template (1192) with the first mention, the second mention and the one or more neighborhood tokens to generate a feature function. The mention generating section (1112) may search for all combinations of a pair of the first mention and the second mention from the sentence to obtain a list of mention pairs.

The mention generating section (1112) may perform the step 803 descried in FIG. 8A. The TRIE section (1113) may store into the 1st stage TRIE character string arrays to obtain partial integer arrays. The TRIE section (1113) may further store into the 2nd stage TRIE partial integer arrays to obtain an identifier array. The TRIE section (1113) may further store into the 3rd stage TRIE the identifier array to obtain one identifier of the alignment of attributes. The obtained identifier may be stored in a storage (1193), such as a memory (103) or a disk (109).

The TRIE section (1113) may perform the steps 804 to 807 described in FIG. 8A.

The present disclosure may be a method, a computer system, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

By the expression "a/one" should be understood as "at least one".

By the expression "comprise(s)/comprising a/one" should be understood as "comprise(s)/comprising at least one".

By the expression "comprise(s)/comprising" should be understood as "comprise(s)/comprising at least".

By the expression "/" should be understood as "and/or".

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for reducing computer memory usage by assigning an identifier to an alignment of attributes extracted from a pair of mentions in an annotated corpus, the method comprising:
    reading a sentence-based annotated document from the annotated corpus;

generating, by machine learning and from the sentence-based annotated document, a computer language model of a feature function template;

storing, into a first TRIE of the computer memory, a character string array A of the model that includes one or more first character strings each representing a first mention attribute of each of one or more first tokens included in a first mention in the annotated document, a character string array B of the model that includes one or more second character strings each representing a second mention attribute of each of one or more second tokens included in a second mention in the annotated document, and a character string array C of the model that includes one or more neighbor character strings each representing a neighbor attribute of each of one or more neighborhood tokens neighboring the first mention or the second mention, wherein the storing into the first TRIE obtains a partial integer array K that includes one or more first identifiers, each first identifier corresponding to the first mention attribute, a partial integer array L that includes one or more second identifiers, each second identifier corresponding to the second mention attribute, and a partial integer array M that includes one or more neighbor identifiers, each neighbor identifier corresponding to the neighbor attribute, wherein the first TRIE is an ordered tree data structure that is used to store a dynamic set or associated array;

storing the partial integer arrays K, L and M into a second TRIE of the computer memory to obtain an identifier array X that includes a first mention identifier, second mention identifier, and a token identifier of the one or more neighborhood tokens; and storing the identifier array X into a third TRIE of the computer memory to obtain one identifier of the alignment of attributes.

2. The method according to claim 1, the method further comprising:

reading a template of a feature function; and applying the template, with the first mention and the second mention and the one or more neighborhood tokens, to generate a second feature function, wherein the generated second feature function comprises one or more first function attributes wherein each of the one or more first function attributes corresponds to each of the one or more first tokens included in the first mention, one or more second function attributes wherein each of the one or more second function attributes corresponds to each of the one or more second tokens included in the second mention, and one or more neighbor function attributes wherein each of the one or more neighbor function attributes corresponds to each of the one or more neighborhood tokens.

3. The method according to claim 2, wherein a character string array D representing an identification name of the template is stored into the first TRIE, while storing the character string arrays A, B and C, to obtain a partial integer array N comprising an identifier of the identification name of the template;

the partial integer array N is stored into the second TRIE, while storing the partial integer arrays K, L and M, to obtain an identifier array Y comprising an identifier of the template, the identifier of the first mention, the identifier of the second mention, and the identifier of the one or more neighborhood tokens; and the identifier array Y is stored into the third TRIE instead of the identify array X to obtain one identifier of the alignment of attributes.

4. The method according to claim 1, wherein the token identifier of the one or more neighborhood tokens includes a plurality of neighborhood tokens, the method further comprising:

repeating a process of storing into another TRIE the identifier array obtained by the immediately preceding storage in the TRIE, until one identifier is obtained from the plurality of the neighborhood tokens.

5. The method according to claim 1, the method further comprising, reading one sentence from the document; and searching for all combinations of a pair of the first mention and the second mention from the sentence to obtain a list of mention pairs.

6. The method according to claim 5, the method further comprising, for each of the mention pairs in the list, performing a process of storing into the first TRIE the character string arrays A, B and C to obtain the partial integer arrays K, L and M, respectively, storing into the second TRIE the partial integer arrays K, L, and M to obtain the identifier array X, and storing into the third TRIE the identifier array X to obtain one identifier of the alignment of attributes, and wherein one identifier obtained from each of the mention pairs is different from each of the mention pairs.

7. The method according to claim 1, wherein each of the first mention and the second mention is a named entity.

8. The method according to claim 1, wherein each of the one or more neighborhood tokens is an inter-token between the first mention and the second mention, a token appearing prior to the first mention in a sentence of the document, or a token appearing posterior to the second mention in the sentence of the document.

9. The method according to claim 1, wherein the attribute is a character string of the token itself, a part of speech of the token, a suffix of the token, a type of a character string of the token, the beginning of a character string of the token being an uppercase letter, or all character strings of a token being uppercase or lower case letters.

10. The method according to claim 1, wherein the identifier of the alignment of attributes is used as a key value for extracting a relation between the first mention and the second mention.

11. The method according to claim 1, wherein the identifier of the alignment of attributes is used as a key value for co-occurrence solution in a search target document.

12. A system for reducing computer memory usage, the system comprising:

a memory storing a program, which, when executed on the processor, performs an operation for assigning an identifier to an alignment of attributes extracted from a pair of mentions in an annotated corpus, the operation comprising:

reading a sentence-based annotated document from the annotated corpus;

generating, by machine learning and from the sentence-based annotated document, a computer language model of a feature function template;

storing, into a first TRIE of the computer memory, a character string array A of the model that includes one or more first character strings each representing a first mention attribute of each of one or more first tokens included in a first mention in the annotated document, a character string array B of the model that includes one or more second character strings each representing a second mention attribute of each of one or more second tokens included in a second mention in the annotated document, and a character string array C of the model that includes one or more neighbor character strings each representing a neighbor attribute of each of one or more neighborhood tokens neighboring the first mention or the second mention, wherein the storing into the first TRIE obtains a partial integer array K that includes one or more first identifiers, each first identifier corresponding to the first mention attribute, a partial integer array L that includes one or more second identifiers, each second identifier corresponding to the second mention attribute, and a partial integer array M that includes one or more neighbor identifiers, each neighbor identifier corresponding to the neighbor attribute, wherein the first TRIE is an ordered tree data structure that is used to store a dynamic set or associated array;

storing the partial integer arrays K, L and M into a second TRIE of the computer memory to obtain an identifier array X that includes a first mention identifier, second mention identifier, and a token identifier of the one or more neighborhood tokens; and storing the identifier array X into a third TRIE of the computer memory to obtain one identifier of the alignment of attributes.

13. The system according to claim 12, the operation further comprising:

reading a template of a feature function, and applying the template with the first mention, the second mention and the one or more neighborhood tokens to generate a feature function, wherein the generated feature function comprises one or more attributes wherein each attribute is for each of the one or more tokens included in the first mention, one or more attributes wherein each attribute is for each of the one or more tokens included in the second mention, and one or more attributes wherein each attribute is for each of the one or more neighborhood tokens.

14. The system according to claim 13, wherein a character string array D representing an identification name of the template is stored into the first TRIE, while storing the character string arrays A, B and C, to obtain a partial integer array N comprising an identifier of the identification name of the template;

the partial integer array N is stored into the second TRIE, while storing the partial integer arrays K, L and M, to obtain an identify array Y comprising an identifier of the template, the identifier of the first mention, the identifier of the second mention, and the identifier of the one or more neighborhood tokens; and the identify array Y is stored into the third TRIE instead of the identify array X to obtain one identifier of the alignment of attributes.

15. The system according to claim 12, the operation further comprising:

reading one sentence from the document; and searching for all combinations of a pair of the first mention and the second mention from the sentence to obtain a list of mention pairs.

16. A computer program product for reducing computer memory usage by assigning an identifier to an alignment of attributes extracted from a pair of mentions in an annotated corpus, the computer program product comprising a computer readable storage medium having program instructions embodied therewith, wherein the computer readable storage medium is not a transitory signal per se, the program instructions executable by a computer to cause the computer to perform a method comprising:

reading a sentence-based annotated document from the annotated corpus;

generating, by machine learning and from the sentence-based annotated document, a computer language model of a feature function template;

storing, into a first TRIE of the computer memory, a character string array A of the model that includes one or more first character strings each representing a first mention attribute of each of one or more first tokens included in a first mention in the annotated document, a character string array B of the model that includes one or more second character strings each representing a second mention attribute of each of one or more second tokens included in a second mention in the annotated document, and a character string array C of the model that includes one or more neighbor character strings each representing a neighbor attribute of each of one or more neighborhood tokens neighboring the first mention or the second mention, wherein the storing into the first TRIE obtains a partial integer array K that includes one or more first identifiers, each first identifier corresponding to the first mention attribute, a partial integer array L that includes one or more second identifiers, each second identifier corresponding to the second mention attribute, and a partial integer array M that includes one or more neighbor identifiers, each neighbor identifier corresponding to the neighbor attribute, wherein the first TRIE is an ordered tree data structure that is used to store a dynamic set or associated array;

storing the partial integer arrays K, L and M into a second TRIE of the computer memory to obtain an identifier array X that includes a first mention identifier, second mention identifier, and a token identifier of the one or more neighborhood tokens; and storing the identifier array X into a third TRIE of the computer memory to obtain one identifier of the alignment of attributes.

17. The computer program product according to claim 16, the method further comprising:

reading a template of a feature function, and applying the template with a pair of the first mention and the second mention to generate a feature function, wherein the generated feature function comprises one or more attributes wherein each attribute is for each of the one or more tokens included in the first mention, one or more attributes wherein each attribute is for each of the one or more tokens included in the second mention, and one or more attributes wherein each attribute is for each of the one or more neighborhood tokens.

18. The computer program product according to claim 17, wherein a character string array D representing an identification name of the template is stored into the first TRIE, while storing the character string arrays A, B and C, to obtain a partial integer array N comprising an identifier of the identification name of the template;

the partial integer array N is stored into the second TRIE, while storing the partial integer arrays K, L and M, to obtain an identify array Y comprising an identifier of the template, the identifier of the first mention, the identifier of the second mention, and the identifier of the one or more neighborhood tokens; and the identify array Y is stored into the third TRIE instead of the identify array X to obtain one identifier of the alignment of attributes.

19. The computer program product according to claim 16, the method further comprising:
reading one sentence from the document; and
searching for all combinations of a pair of the first mention and the second mention from the sentence to obtain a list of mention pairs.

* * * * *